US007405397B2

(12) United States Patent
Covey et al.

(10) Patent No.: US 7,405,397 B2

(45) Date of Patent: Jul. 29, 2008

(54) LASER DESORPTION ION SOURCE WITH ION GUIDE COUPLING FOR ION MASS SPECTROSCOPY

(75) Inventors: Thomas R. Covey, Richmond Hill (CA); Hassan Javaheri, Richmond Hill (CA); Bradley B. Schneider, Bradford (CA)

(73) Assignee: MDS Sciex Inc., Concord, Ontario (CA)

( * ) Notice: Subject to any disclaimer, the term of this patent is extended or adjusted under 35 U.S.C. 154(b) by 143 days.

(21) Appl. No.: 11/317,368

(22) Filed: Dec. 22, 2005

(65) Prior Publication Data

US 2006/0124846 A1 Jun. 15, 2006

Related U.S. Application Data

(63) Continuation-in-part of application No. 11/173,291, filed on Jun. 30, 2005, which is a continuation-in-part of application No. 10/400,322, filed on Mar. 27, 2003, now Pat. No. 6,930,305.

(60) Provisional application No. 60/368,195, filed on Mar. 28, 2002.

(51) Int. Cl.
*H01J 49/00* (2006.01)
*H01J 49/40* (2006.01)
*B01D 54/44* (2006.01)

(52) U.S. Cl. .................. 250/288; 250/281; 250/423 R; 250/425

(58) Field of Classification Search ................. 250/281, 250/288

See application file for complete search history.

(56) References Cited

U.S. PATENT DOCUMENTS 4,740,696 A * 4/1988 Osawa et al. ................ 250/288

(Continued)

FOREIGN PATENT DOCUMENTS

CA 2270713 A1 10/1999

(Continued)

OTHER PUBLICATIONS

Cohen et al., "Small molecule analysis by MALDI mass spectrometry," *Anal. Bioanal. Chem.*, 373,571-586 (2002).

(Continued)

*Primary Examiner*—David A. Vanore
*Assistant Examiner*—Bernard Souw
(74) *Attorney, Agent, or Firm*—Kurt Rauschenbach; Rauschenbach Patent Law Group, LLC

(57) ABSTRACT

A laser desorption ion source provides enhanced ion sampling efficiency and measurement sensitivity by using one or more ion guides to effectively capture ions in a plume emitted from the ion target and guide the ions through an aperture into a downstream vacuum chamber. In one configuration using two RF multipole ion guides, a first RF multipole ion guide disposed next to the ion target is selected to be sufficiently large to capture a substantial portion of the plume, while the second RF multipole ion guide disposed between the first multipole ion guide and the aperture has a smaller dimension to assist focusing of ions into the aperture. The first RF multipole ion guides the ions in the plume into the second RF multipole ion guide, which then focuses the ions so that they pass through the aperture into the downstream vacuum chamber.

11 Claims, 21 Drawing Sheets

U.S. PATENT DOCUMENTS

| | | | | | |
|---|---|---|---|---|---|
| 5,298,743 | A * | 3/1994 | Kato | 250/288 |
| RE34,757 | E * | 10/1994 | Smith et al. | 204/452 |
| 5,373,156 | A * | 12/1994 | Franzen | 250/288 |
| 5,576,540 | A * | 11/1996 | Jolliffe | 250/292 |
| 5,744,798 | A * | 4/1998 | Kato | 250/288 |
| 5,962,851 | A * | 10/1999 | Whitehouse et al. | 250/288 |
| 6,087,657 | A * | 7/2000 | Kato | 250/288 |
| 6,121,607 | A | 9/2000 | Whitehouse et al. | |
| 6,331,702 | B1 * | 12/2001 | Krutchinsky et al. | 250/281 |
| 6,348,688 | B1 | 2/2002 | Vestal | |
| 6,410,915 | B1 * | 6/2002 | Bateman et al. | 250/288 |
| 6,586,731 | B1 * | 7/2003 | Jolliffe | 250/288 |
| 6,680,475 | B2 * | 1/2004 | Krutchinsky et al. | 250/281 |
| 6,930,305 | B2 * | 8/2005 | Covey et al. | 250/288 |
| 6,977,371 | B2 * | 12/2005 | Bateman et al. | 250/288 |
| RE39,099 | E * | 5/2006 | Krutchinsky et al. | 250/281 |
| 7,170,051 | B2 * | 1/2007 | Berkout et al. | 250/281 |
| 7,256,395 | B2 * | 8/2007 | Collings et al. | 250/288 |
| 7,259,371 | B2 * | 8/2007 | Collings et al. | 250/288 |
| 2002/0079443 | A1 | 6/2002 | Krutchinsky et al. | |
| 2003/0025074 | A1 | 2/2003 | Li | |
| 2003/0213901 | A1 | 11/2003 | Covey et al. | |
| 2004/0195503 | A1 * | 10/2004 | Kim et al. | 250/288 |
| 2004/0211897 | A1 * | 10/2004 | Kim et al. | 250/288 |
| 2005/0092912 | A1 | 5/2005 | Krutchinsky et al. | |
| 2005/0285031 | A1 * | 12/2005 | Schneider et al. | 250/288 |
| 2006/0108520 | A1 * | 5/2006 | Park et al. | 250/287 |
| 2006/0124846 | A1 * | 6/2006 | Covey et al. | 250/288 |
| 2006/0151692 | A1 * | 7/2006 | Collings et al. | 250/290 |
| 2006/0169891 | A1 * | 8/2006 | Collings et al. | 250/291 |
| 2006/0273254 | A1 * | 12/2006 | Berkout et al. | 250/288 |
| 2006/0284076 | A1 * | 12/2006 | Scheidemann et al. | 250/288 |
| 2007/0114384 | A1 * | 5/2007 | Berkout et al. | 250/287 |
| 2007/0187614 | A1 * | 8/2007 | Schneider et al. | 250/396 R |

FOREIGN PATENT DOCUMENTS

| | | |
|---|---|---|
| WO | WO 99/38185 | 7/1999 |
| WO | WO 00/77822 A3 | 12/2000 |

OTHER PUBLICATIONS

Go et al., "Desorption/Ionization on Silicon Time-of-Flight/Time of Flight Mass Spectrometry," *Anal. Chem.*, 75 (10), 2504-2506 (2003).

Go et al., "Quantitative Analysis with Desorption/Ionization on Silicon Mass Spectrometry Using Electrospray Deposition," *Anal. Chem.*, 75 (20), 5475-5479 (2003).

Guo et al., "A Method for the Analysis of Low-Mass Molecules by MALDI-TOF Mass Spectrometry," *Anal. Chem.*, 74(7), 1637-1641 (2002).

Hatsis et al., "Quantitative analysis of small pharmaceutical drugs using a high repetition rate laser matrix-assisted laser/desorption ionization source," *Rapid Communications in Mass Spectrometry*, 17, 2303-2309 (2003).

Hayes et al, "Desorption-Ionization Mass Spectrometry Using Deposited Nanostructured Silicon Films," *Anal. Chem.*, 73 (6), 1292-1295 (2001).

Kinumi et al., "MALDI-TOP/MS using Inorganic Particle Matrix for Small Molecule Analysis," *Proceedings of the 48th ASMS Conference on Mass Spectrometry and Allied Topics* (2000).

Leriche et al., "An experimental comparison of electrospray ion-trap and matrix-assisted laser desorption/ionization post-source decay mass spectra for the characterization of small drug molecules," *Rapid Communications in Mass Spectrometry*, 15, 608-614 (2001).

Lin et al., "Laser Desorption/Ionization Time-of-Flight Mass Spectrometry on Sol-Gel-Dervived 2,5-Dihydroxybenzoic Acid Film," *Anal. Chem.*, 74 (22), 5793-5798 (2002).

Reyzer et al., "Direct analysis of drug candidates in tissue by matrix-assisted laser desorption/ionization mass spectrometry," *Journal of Mass Spectrometry*, 38, 1081-1092 (2003).

Shen et al., "Porous Silicon as a Versatile Platform for Laser Desorption/Ionization Mass Spectrometry," *Anal. Chem.*, 73(3), 612-619 (2001).

Wei et al., "Desorption-ionization mass spectrometry on porous silicon," *Nature*, 399, 243-246 (1999).

* cited by examiner

MRM Peak FWHM - Haloperidol

Prazosin Fragmentation Test

LASER DESORPTION ION SOURCE WITH ION GUIDE COUPLING FOR ION MASS SPECTROSCOPY

CROSS-REFERENCE TO RELATED APPLICATIONS

This application is a continuation-in-part of U.S. application Ser. No. 11/173,291, filed Jun. 30, 2005, which is a continuation-in-part of U.S. application Ser. No. 10/400,322, filed Mar. 27, 2003, which claims the priority of U.S. Provisional Application 60/368,195, filed Mar. 28, 2002.

FIELD OF THE INVENTION

The present invention relates generally to ion mass spectrometry, and more particularly to method and apparatus to enhance the sampling rate and transmission efficiency of ions from an ion source, such as a matrix assisted laser desorption ion (MALDI) source.

BACKGROUND OF THE INVENTION

Quantitative analyses of pharmaceutically and biologically important compounds, such as drugs and metabolites, are important applications of mass spectroscopy. Traditionally, ion sources based on electrospray ionization (ESI) and atmospheric pressure chemical ionization (APCI) are used in combination with triple-quadrupole mass spectrometers (triple quads) to provide quantitative analysis. The combination provides both high sensitivity and high specificity. ESI and APCI both generate ions from flowing liquid streams, and are therefore used by pumping organic and aqueous solvent streams containing the compounds to be analyzed through the source. Liquid chromatography is commonly used as an on-line separation technique prior to the mass spectrometer. Thus, samples can be introduced by injecting a known volume containing the sample into the liquid flow, and using the mass spectrometer to monitor specific combinations of ion mass/charge values that correspond to known precursor and product fragment ions using the scan mode known as multiple-reaction-monitoring (MRM) mode. During the scan, samples are injected sequentially, at a rate in the order of 1 per 10 second, due to limitations in autosamplers, as well as limitations imposed by the natural width of the eluting peak. Once the sample has passed through the ion source, it is ionized and dissipated in the source, with only a small fraction of the ions generated from the sample actually being sampled into the mass spectrometer system.

Matrix assisted laser desorption/time-of-flight (MALDI/TOF) is a different type of mass spectrometer technique, in which samples are mixed with a UV-absorbing compound (the matrix), deposited on a surface, and then ionized with fast laser pulses. A short burst or plume of ions is created in the ion source of the mass spectrometer by the laser, and this plume of ions is analyzed by a time-of-flight mass spectrometer, by measuring the flight time over a fixed distance (starting with the ion creating pulse). This technique is inherently a pulsed ionization technique (required for the time-of-flight mass spectrometer) as well as a batch-processing technique, since samples are introduced into the ion source in a batch (of samples located in small spots on a plate) rather than in a continuous flowing liquid stream. MALDI/TOF has been almost exclusively used for the analysis of biopolymers such as peptides and proteins. The technique is sensitive and works well for fragile molecules such as those mentioned, and the TOF method is particularly suitable for the analysis of high-mass compounds. However, until recently, there has been no viable method of doing true MS/MS with this type of instrument. Instead, the method of post-source decay (PSD) is used to provide some fragmentation information. In this technique, precursor ions are selected in the flight tube with an ion gate, and then those ions that fragment before the ion mirror (due to excess energy carried away from the source) can be mass resolved. This technique provides relatively poor sensitivity and mass accuracy, and is not considered to be a high performance MS/MS technique. The MALDI technique also suffers from the fact that while the mass accuracy and resolution can be very high (up to 30,000 resolution at low mass, and accuracy of a few parts-per-million), these important features are difficult to achieve because they depend on the microstructure of the sample surface (roughness), the laser fluence, and other instrumental characteristics which can be hard to control. Good mass accuracy typically requires that calibration compounds be placed on the sample surface close to the actual sample itself. The MALDI/TOF technique has mainly been used for spectral analyses. Some previous attempts have been made to use MALDI for quantitative analysis, but they have met with limited success because of the poor precision obtained with MALDI/TOF.

Recently, the method of combining MALDI with orthogonal TOF has been introduced by a group at the University of Manitoba. This technique, called Orthogonal MALDI, or "oMALDI™" (trademark of Applied Biosystems/MDS SCIEX Instruments, Concord, Ontario, Canada) as described in U.S. Pat. No. 6,331,702 (assigned to the University of Manitoba), is an apparatus and method enabling a pulsed source, such as a MALDI source, to be coupled to a variety of spectrometer instruments, in a manner which more completely decouples the spectrometer from the source and provides a more continuous ion beam with smaller angular and velocity spreads. In this technique, ions generated from a MALDI source as plumes (typically at the rate of less than 20 Hz, with pulse widths of a few nanoseconds from the laser pulse) are collisionally cooled in a relatively high pressure region containing a damping gas within an RF ion guide. Collisions with the damping gas convert the plumes into a quasi-continuous beam. This quasi-continuous beam is then analyzed with orthogonal time-of-flight, in which the ions enter orthogonally to the axis of the TOF and are pulsed radially.

There are several advantages to this combination that are not available from conventional MALDI/TOF. The TOF resolution and mass accuracy are decoupled from the source conditions such as laser fluence and sample morphology. The ions are slowed to near thermal energies from which they can conveniently be re-accelerated to tens of electron volts for collisionally activated decomposition (CAD) in a collision cell. The flux of ions in the beam is low enough (through having the beam stretched out in time) that a time-to-digital converter (TDC) can be used for ion detection. The result is that high mass accuracy and resolution can be achieved under a wide range of operating conditions. In addition, a mass resolving quadrupole and collision cell can be placed before the TOF analyzer to provide an MS/MS configuration. Precursor ions from the MALDI source are collisionally cooled, then selected by the quadrupole mass filter, fragmented in the collision cell, and the fragments mass analyzed by the TOF. This provides high mass resolution and sensitivity for MS/MS of MALDI ions, which has not been previously available. This MS/MS configuration is referred to as QqTOF, where Q refers to the mass filter quadrupole and q refers to the RF-only collision cell.

The Manitoba group recognized that the oMALDI™ technique allows a MALDI source to be efficiently coupled to a quadrupole mass spectrometer system, because of the near-continuous nature of the ion beam. However, there is no recognition that this might offer improved ability to measure sample concentrations quantitatively.

One important factor for certain applications regarding the performance of any ion mass analyzing technique is the ability to effectively capture ions from the ion source and transport them to the analyzing device so that they can be analyzed. This factor is of particular importance for analytical techniques, such as the MRM scan, that are directed to quantitative measurements of ions of interest. With a MALDI source, each laser pulse impinging on the MALDI target generates a plume of ions and neutral particles. The ions have to be delivered to a mass analyzer, either directly or through an ion transport device, so that they can be analyzed. The mass analyzer or ion transport device, such as a quadrupole ion guide, typically has a very limited ion acceptance zone, and an inlet aperture is often used to collimate the incoming ions. An aperture is also often used for the purposes of preventing unwanted materials released by the sample target from contaminating the mass analyzer or ion guide, and separating the MALDI source from the downstream vacuum chamber in which the mass analyzer or ion transport device is located. Such an aperture is typically significantly smaller than the width of the plume of ions coming off the MALDI target. As a result, a significant portion of the ions in the plume cannot enter the aperture and be detected by the mass analyzer. Also, the central axis of the plume may be at an angle from the aperture, which further reduces the portion of ions that will go through the aperture. As a result, the measurement sensitivity of the mass spectrometer is significantly reduced, as the sampling efficiency of the ions, i.e., the portion of ions from the ion source that is analyzed by the downstream mass analyzer, can be rather low.

SUMMARY OF THE INVENTION

In view of the foregoing, the invention provides a mass spectrometry quantitation technique that enables high-throughput quantitation of samples, especially small molecules, using a laser-desorption (e.g., MALDI) ion source coupled to a mass analyzer, such as a triple-quadrupole mass analyzer. As used herein, the term "small molecules" means compounds that are not inherently polymeric in nature and, as such, are not composed of repeating subunit classes of compounds. Small molecules fall outside the realm of biological macromolecules or polymers, which are composed of repeating subunit entities such as proteins and peptides (composed of amino acid subunits), DNA and RNA (composed of nucleic acid subunits), or cellulose (composed of sugar subunits).

In accordance with an aspect of the invention, the ions generated by laser-desorption of a sample material are collisionally damped/cooled, and then quantitatively analyzed using the triple-quad operating in the multiple-reaction-monitoring (MRM) mode. In one mode of operation, significantly improved measurement sensitivity is obtained by applying laser pulses to the ion source at a high pulse rate, preferably about 500 Hz or higher. This allows the data acquisition to be performed rapidly, and the speed of one second or so for each sample point on the ion source target has been achieved.

In accordance with a feature of the present invention, the throughput of the quantitation is significantly improved by illuminating each sample spot on the MALDI target with laser light from a laser for an irradiation period or duration that is significantly shorter than the time required to deplete the sample spot. The ions generated by laser-desorption of the sample material are collisionally damped/cooled, and then quantitatively analyzed using the triple-quad operating in the multiple-reaction-monitoring (MRM) mode. The duration of the laser illumination is preferably significantly shorter than the duration required to deplete the sample spot, and may be comparable to or shorter than the peak broadening caused by the ion transfer during transporting the ions from the sample target for the MRM detection.

In accordance with another aspect of the invention, an interfacing arrangement is provided for effectively coupling ions from a MALDI source to a mass analyzer or an ion transport device disposed in a vacuum chamber downstream from the MALDI source such that a substantial portion of the ions in a plume from the MALDI target can reach the mass analyzer, thereby significantly increasing the ion sampling efficiency and thus measurement sensitivity. The enhanced coupling is achieved by using at least one ion guide disposed between the MALDI target and the aperture that separates the MALDI target from the downstream vacuum chamber containing the ion mass analyzer or ion transport device. The ion guide receives ions in a plume emitted from the MALDI target and guides the ions such that a significant portion of the ions goes through the aperture and enters the acceptance zone of the ion mass analyzer. The MALDI ion source with enhanced ion sampling efficiency can be effectively used with, for instance, a triple-quadrupole arrangement for MRM detection, or with other types of mass analyzing devices for different ion mass spectroscopic techniques. Also, the ion coupling arrangement can be used with laser-desorption ion sources that are not matrix assisted to enhance the sampling efficiency and measurement sensitivity.

In one configuration, the ion coupling arrangement includes an RF multipole ion guide, such as a quadrupole ion guide, that has a sufficiently large diameter to accept a substantial portion of the ion plume. The gas pressure in the vacuum chamber containing the MALDI target and the RF multipole ion guide is set at a value, on the order of one Torr or higher, to provide effective damping of the ions in the plume. The RF multipole ion guide is operated to focus the ions in the plume and guide them to go through the aperture separating the MALDI source from a downstream vacuum chamber containing the analyzing device.

In another configuration, the ion coupling arrangement includes at least two RF multipole ion guides. The first RF multipole ion guide is disposed next to the MALDI target and has a diameter selected to be sufficiently large to capture a substantial portion, preferably 50% or higher, of the plume coming off the MALDI target. The first multipole ion guide is operated to focus the ions and guide them into the second RF multipole ion guide, which can have a diameter smaller than that of the first RF multipole ion guide to provide additional ion focusing. The second RF multipole ion guide guides the ions delivered to it by the first RF multipole ion guide so that the ions go through the aperture and into the downstream vacuum chamber containing the mass analyzer or an ion transport device.

DETAILED DESCRIPTION OF THE INVENTION

Figure 1:
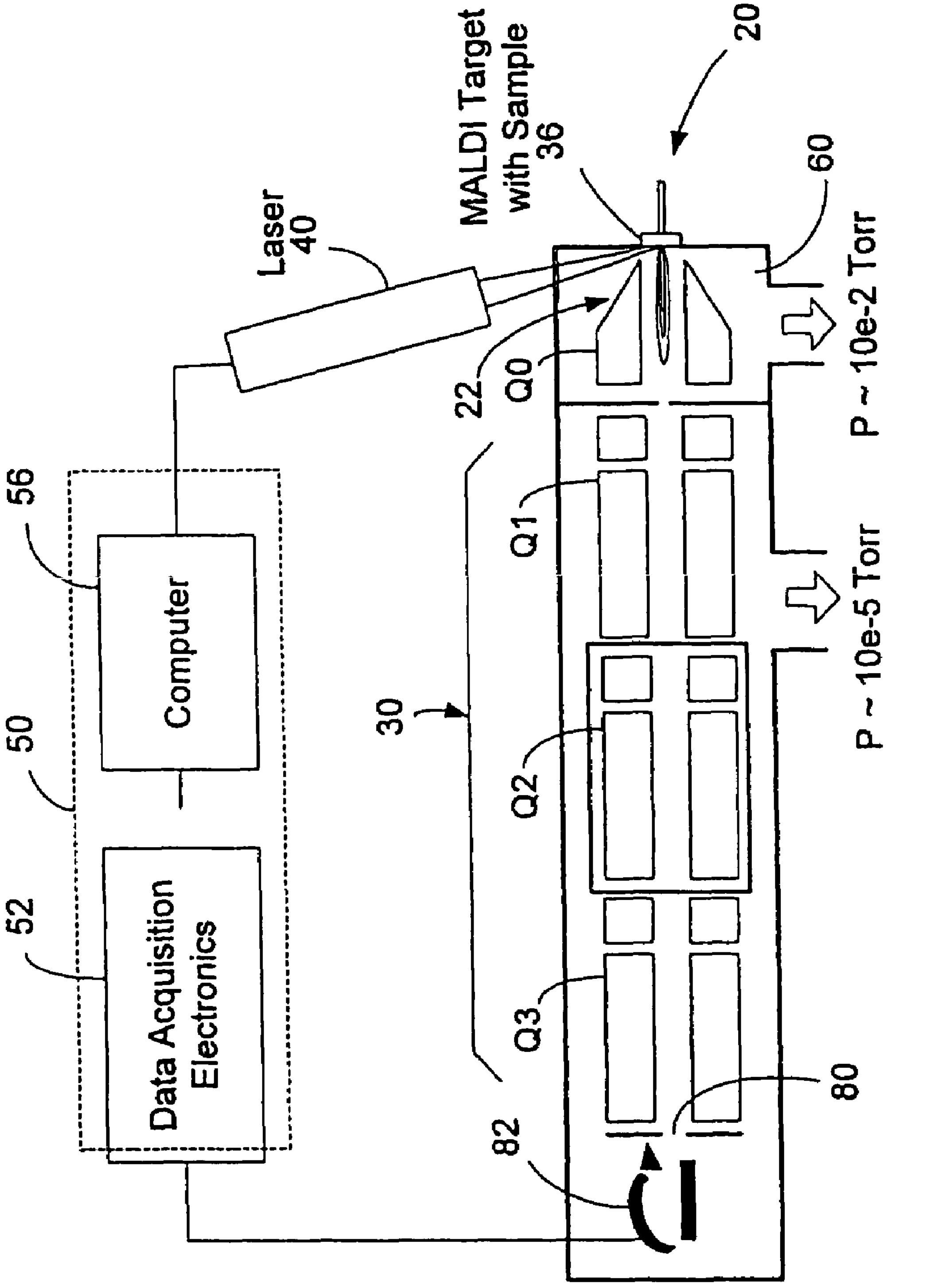
FIG. 1 is a schematic view of an embodiment of a mass spectrometer system in accordance with the invention that includes a MALDI ion source and a triple-quadrupole mass analyzer operated in the MRM mode for high-throughput quantitation of small molecules.

Referring now to the drawings, wherein like reference numerals refer to like elements, FIG. 1 shows an embodiment of a mass spectrometer system that includes an ion source and a mass analyzer. In accordance with the invention, the ion source is a matrix-assisted-laser-desorption ion (MALDI) source 20 coupled to a collision-damping setup 22, and the mass analyzer is a triple-quadrupole device 30 that is operated in the multiple-reaction-monitoring (MRM) mode. To activate the MALDI ion source, laser light or typically pulses of laser light generated by a laser 40 is directed onto a sample target 36 of the MALDI ion source 20. As described in greater detail below, in one mode of operation, the laser may be of a type capable of firing at a pulse rate of a relatively high rate, such as about 500 Hz or higher. In accordance with a feature of the present invention, the laser may be a continuous laser, and the irradiation period for each sample spot is controlled to be significantly shorter than the time required to deplete the sample spot. The significantly reduced irradiation time results in significantly reduced widths of the MRM peaks while maintaining good signal/noise ratios, and provides a significantly improved throughput of the quantitation analysis with improved peak width reproducibility.

The mass spectrometer is connected to a data acquisition system 50, which includes data acquisition electronics 52 for data collection, and a computer 56 programmed to control the operations of the system to perform mass spectrometry studies. Particularly, the computer 56 controls the pulse rate of the laser 40, and controls, via interface to the data acquisition electronics 52, the operation of the triple-quadrupole mass analyzer 30 to carry out the MRM study.

Figure 2:
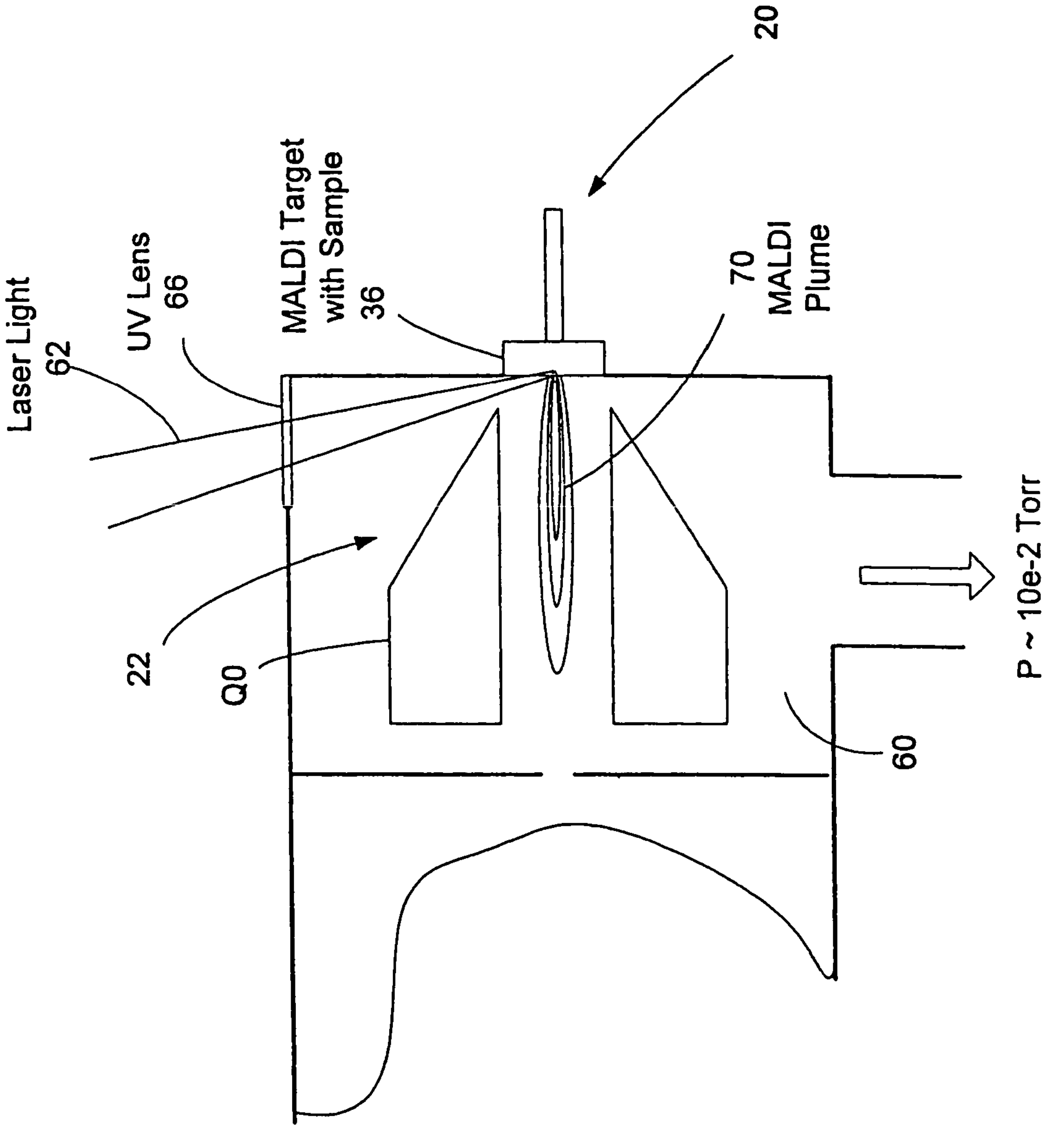
FIG. 2 is a schematic close-up view of the MALDI ion source of the mass spectrometer system of FIG. 1.

As shown in FIG. 2, in a preferred embodiment, the ions to be analyzed are generated from the target 36 of the MALDI source inside a vacuum chamber 60. The ultraviolet (UV) light 62 generated by the laser 40 is transmitted though a UV lens 66 into the vacuum chamber 60 and directed onto the surface of the MALDI sample target 36. Each laser pulse generates a plume 70 of ions from the sample target 36. This plume 70 is collisionally cooled by the gas in the vacuum chamber and confined by the quadrupole ion guide Q0 disposed adjacent the sample target 36.

Figure 3:
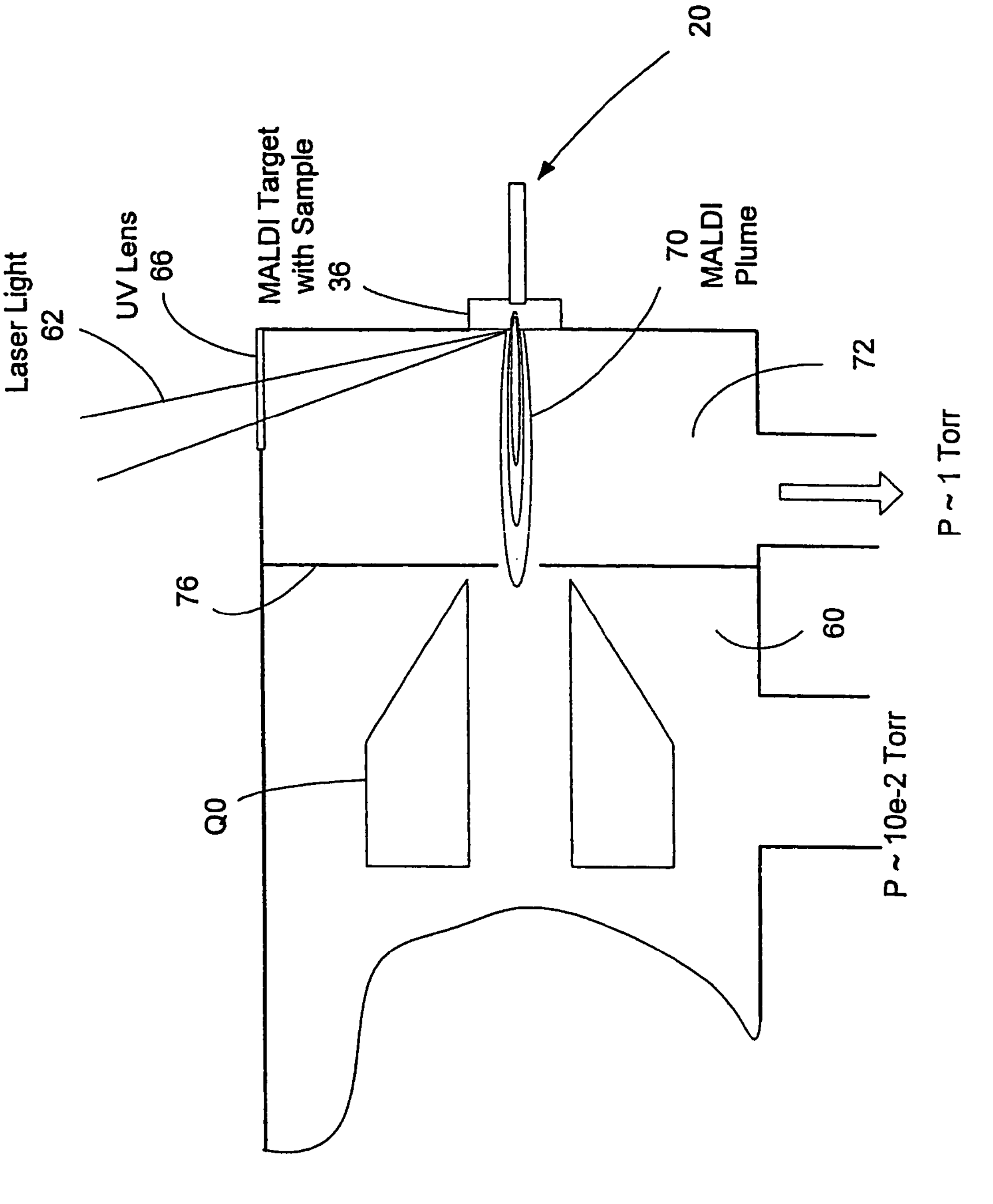
FIG. 3 is a schematic view of an alternative arrangement in which the MALDI ion source is in a differentially pumped vacuum chamber.

FIG. 3 shows an alternative embodiment in which the sample target 36 is disposed in a vacuum region 72 that is separated by partition 76 from the vacuum region 60 in which the quadrupole set Q0 sits. Partition 76 can be a flat plate as indicated in FIG. 3, or other shaped configuration known in the art, such as a skimmer or a cone. This arrangement allows the plume 70 coming off the sample target 36 to be exposed to a collision-damping gas at a pressure higher than the pressure in the second vacuum region 60.

Figure 4:
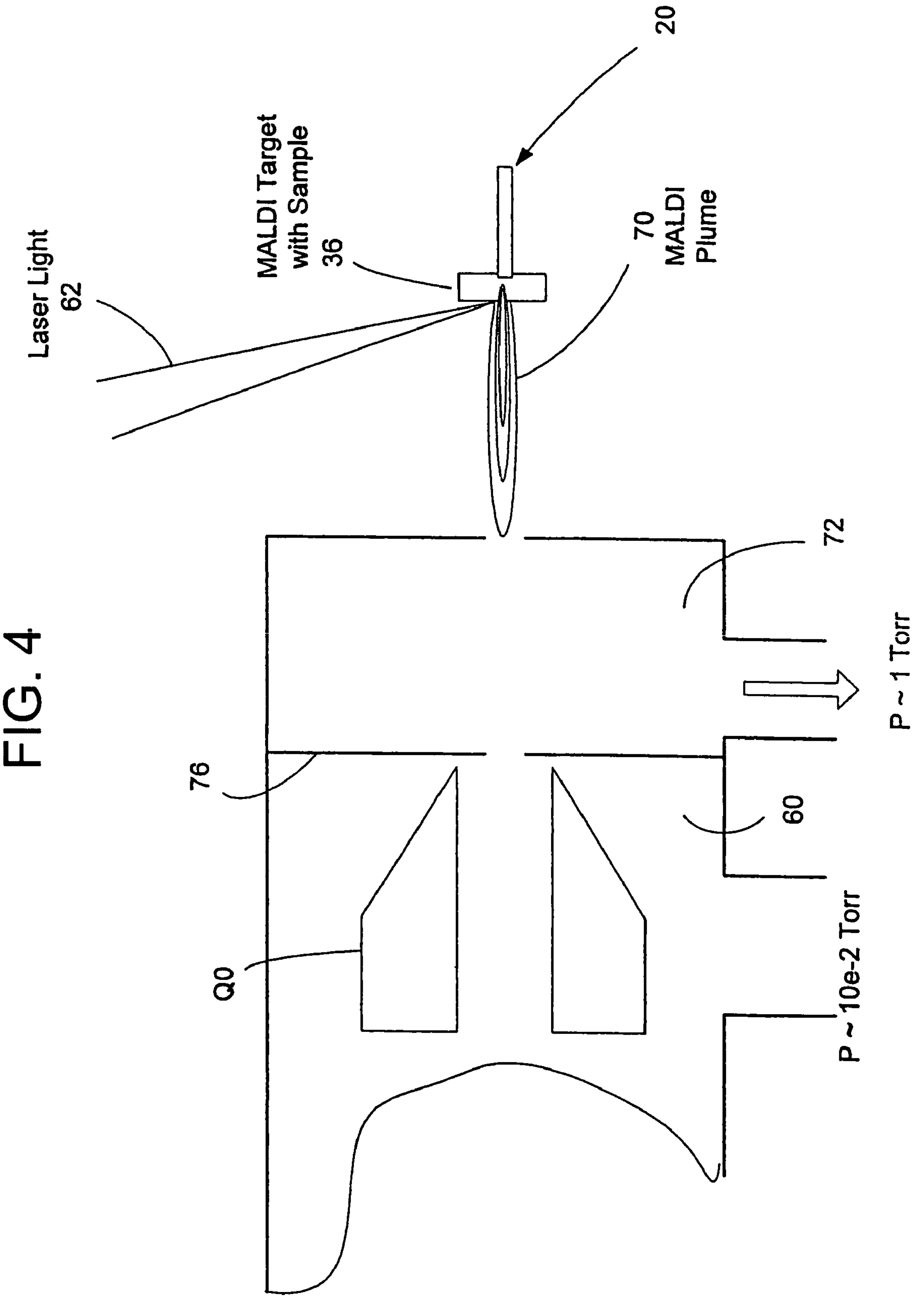
FIG. 4 is a schematic view of another alternative embodiment in which the MALDI ion source is at atmospheric pressure.

FIG. 4 shows another alternative embodiment in which the sample target 36 is positioned in the atmosphere outside the vacuum region 72. As a result, the plume 70 of ions is created in atmospheric pressure. The plume 70 of ions then passes through the differentially pumped vacuum region 72 and enters the vacuum region 60 of the quadrupole set Q0. Although FIG. 4 shows a relatively simple configuration for atmospheric pressure (AP) MALDI, it will be apparent to those skilled in the art that the current invention also relates to other AP MALDI configurations including, but not limited to, configurations with gas conductance limiting heated tubes or orifice plates, capillary extenders, curtain gases, or combinations of the above.

Returning to FIG. 1, in the illustrated embodiment, the triple-quad 30 includes three sets of quadrupole rods designated Q1, Q2, and Q3. When the triple-quad 30 is operated in the MRM mode, the first quadrupole rod set Q1 is operated to select a "precursor" ion from the plume 70 of ions generated by the MALDI source 20. The second quadrupole rod set Q2 is operated to cause fragmentation of the precursor ion selected by the first quadrupole set Q1 by means of collisions with the gas in the space confined by the rods Q2. The third quadrupole rod set Q3 is then operated to select a particular "product" ion from the ions generated by fragmenting the precursor ion. The product ion selected by the quadrupole rods Q3 passes through an aperture 80 and is collected by an electrical pulse generation device 82, such as a CHANNELTRON® electron multiplier device known to those skilled in the art. The pulses generated by the pulse generation device 82 are detected by the data acquisition electronics 52, which typically includes pulse detection devices and counters, etc. The data collected by the data acquisition electronics 52 are sent to the computer 56 for storage, display, and analyses. For purposes of the MRM mode detection, the pulses generated by the pulse generation device 82 are collected and counted as a function of the duration of time the sample target is ablated by laser pulses.

In one mode of operation, high throughput quantitation of small molecules can be achieved by combining a triple quad mass analyzer operating in the MRM mode with a MALDI source activated with laser pulses at a high repetition rate, such as about 500 Hz or higher, preferably between about 500 Hz and 1500 Hz, and collisionally damping the ion plumes generated by the laser pulses. This result was unexpected because prior to the discovery it was unknown whether the use of a MALDI source would allow quantitative analyses for small molecules, or what the sensitivity would be, of if there would be sufficient speed of analysis to accept a sensitivity compromise, if any. The use of a high laser pulse rate provides enhanced measurement sensitivity, resulting in the ability to make very-high-throughput quantitative measurements on certain compounds that could not be adequately detected under high throughput conditions using laser pulse rates typical in traditional MALDI, and much better reproducibility of the signal. The ability to use relatively high laser fluence without degrading the mass spectrometer signal is believed to be due to the presence of a damping gas in the ion path, which cools the ions through collisions. The collisional cooling also converts the pulsed ion beam into a quasi-continuous ion beam, which can be efficiently analyzed with a triple quadrupole mass spectrometer using the MRM mode of operation. The higher the laser pulse rate, the more continuous the ion beam becomes.

Due to the high sensitivity and throughput of the quantitation technique described above, measurements can be performed at a relatively high speed. It has been shown that a laser pulse rate of about 1000-1500 Hz allows throughput rates well above one sample per second. Since high throughput quantitation is the goal, it is not desired to “hunt and peck” around on a sample spot, it is desired to aim “at” the sample spot and start taking quantitation-quality data. Choice of matrix, and hence sample spot formation may be influenced by this requirement. Many matrix and matrix-less materials have been tried, and an example of a matrix material that has been shown to provide good sensitivity and spot-to-spot and day-to-day reproducibility is (α-cyano ((α-Cyano-4-hydroxycinnamic acid) (a.k.a. HCCA). HCCA is also typically used for MALDI/TOF analysis of peptides and proteins. The method described herein, however, can typically be used with any type of MALDI matrix or without any MALDI matrix.

In operation, samples to be analyzed are deposited on a sample target plate that typically may contain from 96 to 384, or more, sample spot positions. One of the main application areas of this quantitation technique is the quantitation of pharmaceutical compounds and their metabolites or reaction products. Solutions containing the material of interest are typically extracted from a biological sample such as blood or urine or plasma, or from a buffer solution containing enzymes that have been used to react with the samples. Some simple clean-up procedure maybe used in order to remove most of the unwanted salts or proteins. A small volume, usually less than 1 microliter, can then be mixed with a matrix solution. The matrix solution is selected in order to efficiently absorb ultraviolet light at the wavelength of the laser, which is, for example, 335 nanometers. The mixture of sample solution and matrix (or sample solution alone for matrix-less samples) can be deposited on the sample plate by various means including but not limited to electrostatic, nebulizer, or dried droplet deposition as known in the art. After the sample is allowed to dry on the plate, a spot of crystallized material is formed containing the sample of interest. The plate is inserted into the ion source of the mass spectrometer. In one configuration, the plate is inserted into a holder that is moved by stepper motors such that the sample spot of interest is in front of the ion optics of the mass spectrometer. An O-ring around the sample plate provides a vacuum seal. The laser is fired repetitively at the sample spot in order to desorb and ionize the sample. The ions of interest (both those of the internal standard and those of the analyte) are monitored by the mass spectrometer, using typical dwell times in the range of a few milliseconds to several hundred milliseconds, depending on the laser pulse rate. As described in greater detail below, in this mode of operation, the laser is fired at a high rate, from about 500 Hz up to, for example, about 1500 Hz. In one method, the plate remains stationary while the laser is fired for a fixed period of time (e.g. 1 second), and the ion signal intensity is integrated for this time period in order to provide a measure of the amount of sample consumed. In another method, the laser is fired until the ion signal is reduced to a low level, indicating that the sample is fully depleted in this region. In another method, the sample plate is moved in a small pattern in order to bring new regions of sample into the path of the laser light as the ion signal is being measured. This can provide a more representative signal if the sample is inhomogeneously dispersed, but more time is required to process each sample. The second method is described in more detail by the following example.

An example of the high-throughput quantitation process using pulsed laser light for ion generation is described below. A fresh part of the sample spot is presented in front of the laser for the duration of the data acquisition. For quantitative MRM analysis an internal standard is included in the sample, and is therefore present in the sample spot. The chromatographic (signal as a function of time) data acquisition is started (for both the analyte and the internal standard), with the laser light not striking the sample spot. The laser light is permitted to strike the sample spot and ablate the sample from the same location on the sample spot (i.e. the sample is not moved during ablation). This causes the ion signal to increase significantly from the background level, reach a peak, and then decrease back to the background level as the sample is completely desorbed. The laser light is stopped from striking the sample spot once the ion signal has returned to the background level. The laser is then moved on to the next location on the sample target from which data will be taken. The next location may be another location in the same sample spot or a completely different sample spot.

To provide a reference, data are taken for the same ion pairs for a “matrix blank” from a sample spot containing only the matrix and the sample solvent in a predetermined ratio, such as 1:1. From the data that present ion signals as a function of time, which look much like LC/MS flow injection peaks, the peak areas for the analyte and internal standard peaks are calculated, and the ratio of analyte area to internal standard area for each peak is taken, and results are plotted accordingly.

Figure 5:
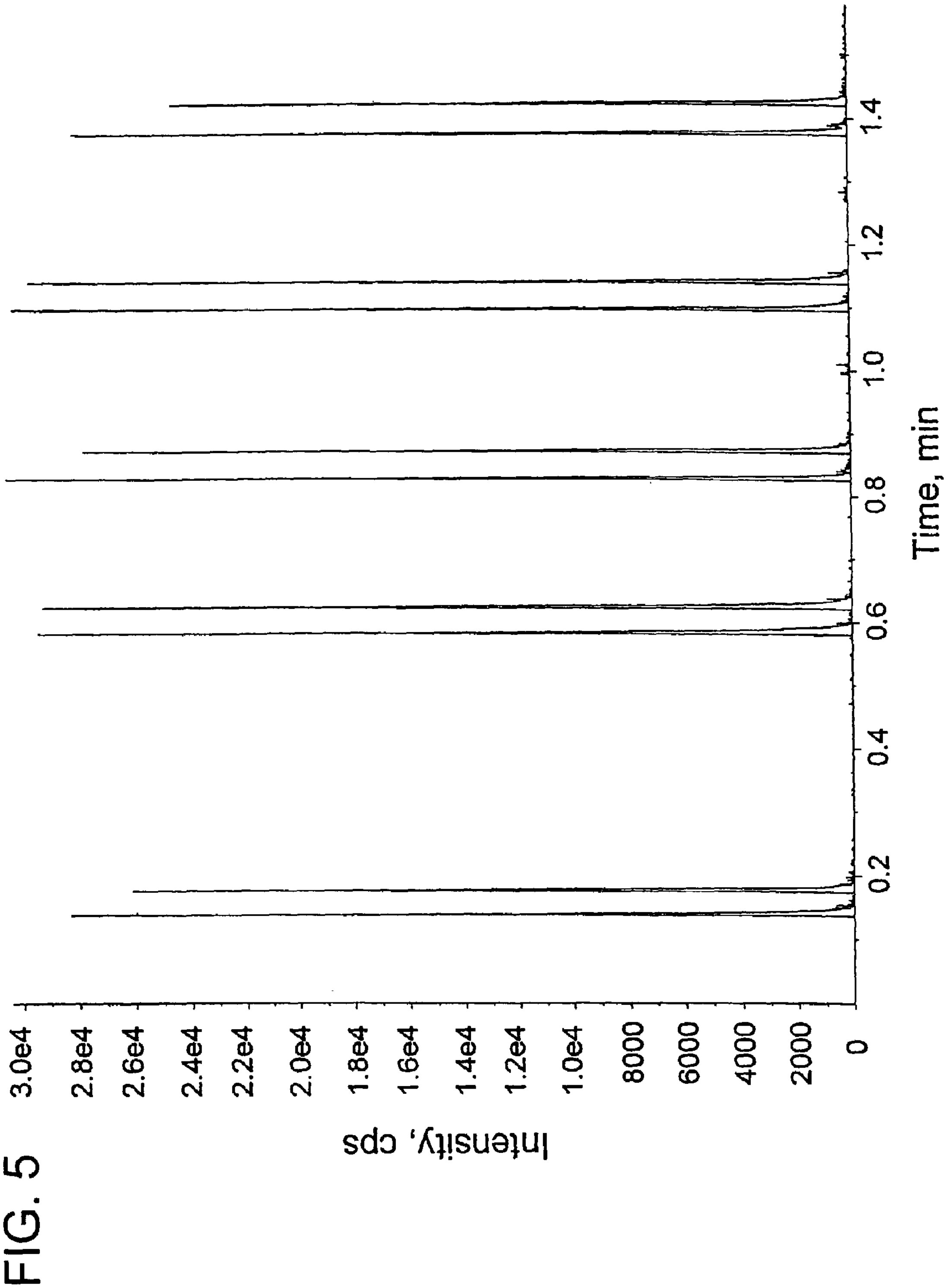
FIG. 5 is a chart showing exemplary MRM data taken using the high-throughput quantitation technique of the invention.

FIG. 5 gives an example of the type of MRM data acquired using this technique. In this case the laser was fired at two discrete locations on each of five sample spots. The analyte was 25 pg/ul Haloperidol (a commercially available compound). Data were acquired using a 20 ms dwell time to monitor the 376.0/165.1 m/z ion pair. The laser was operated at 1400 Hz and ~6 uJ per pulse. For such MRM quantitative analyses samples of 0.2 to 1 ul are deposited onto the target plate (above data was from 0.2 ul spots). There are at least 10 data points per peak in all cases. The average peak width is given by a Full Width at Half Maximum (FWHM) of 130 msec, which offers the possibility of routine analytical throughput at speeds not attainable from typical atmospheric pressure ionization sources used on mass spectrometers, such as the previously mentioned ESI and APCI sources.

Figure 6:
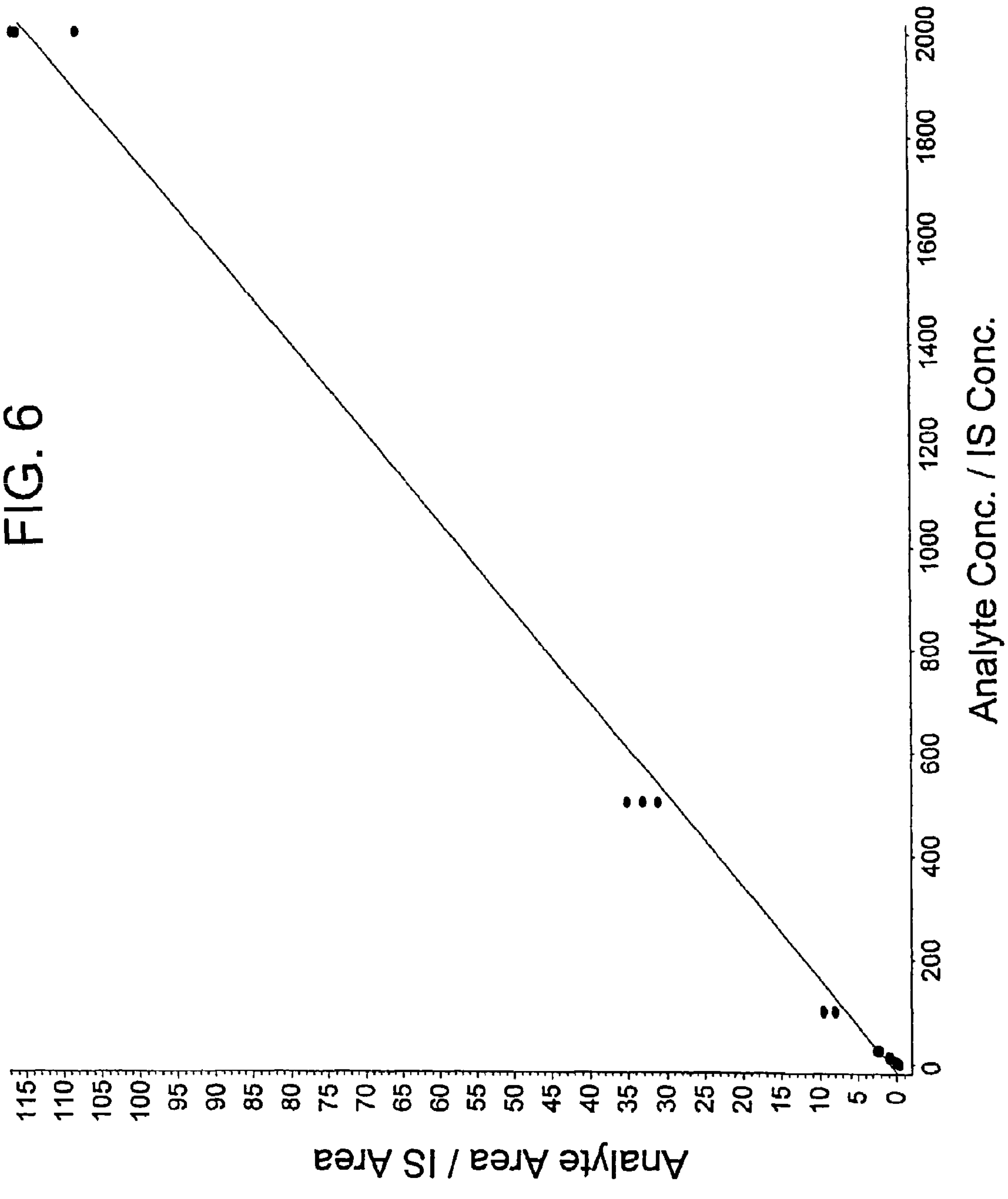
FIG. 6 is a chart showing an exemplary calibration curve.
Figure 7:
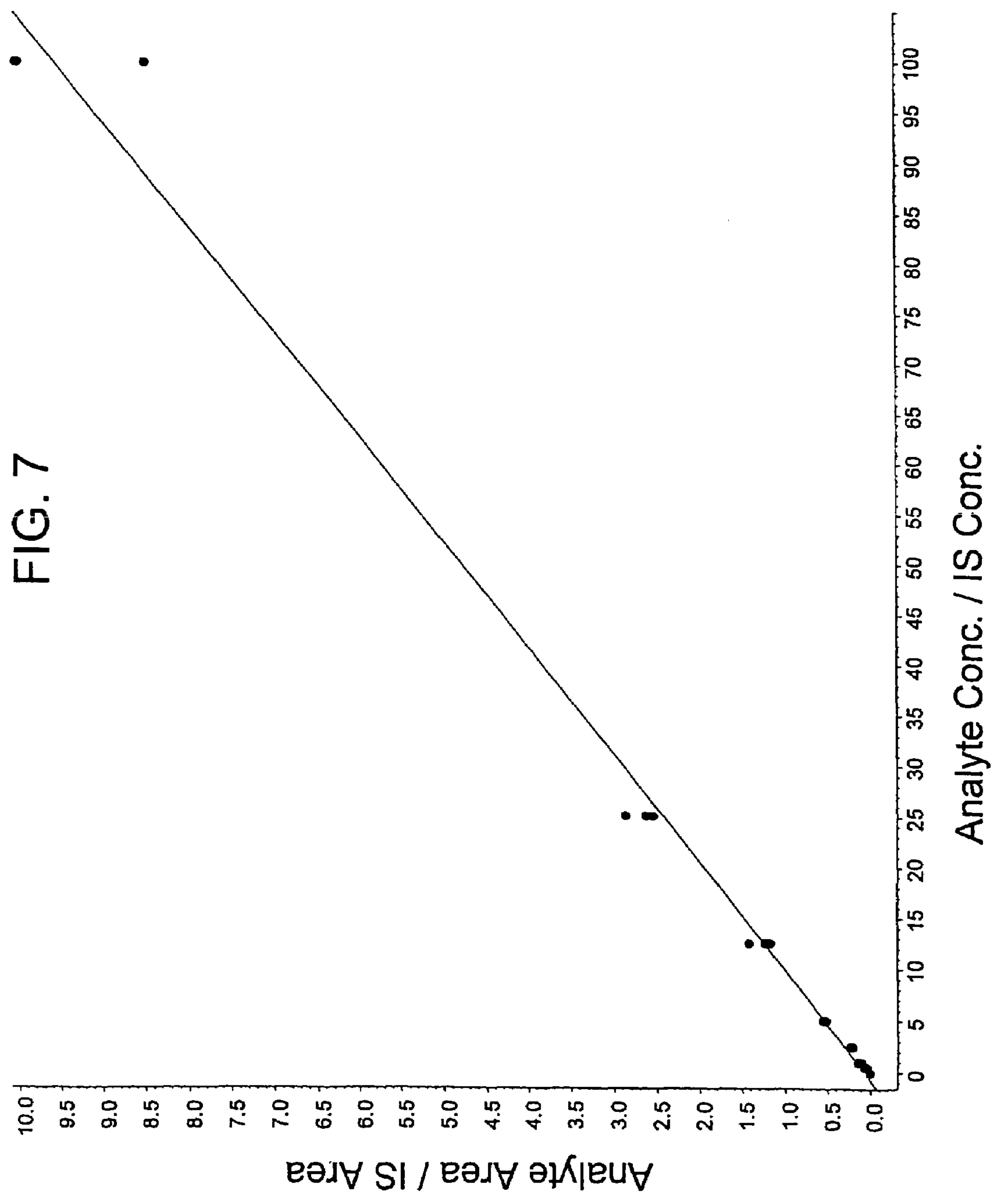
FIG. 7 is a chart showing an exemplary calibration curve similar to that of FIG. 6 but for a lower concentration range.

Using this method, calibration curves can be generated, such as the one shown in FIG. 6 for Lidoflazine, a commercially available compound. A concentration of 5 pg/ul Prazosin was included in the sample preparation, and was used as the internal standard. All MRM concentration data points were acquired in triplicate with a 10 msec dwell time for the analyte ion pair and a 10 msec dwell time for the internal standard. The ion pairs monitored were 386.2/122.0 for Lidoflazine, and 384.2/247.0 for Prazosin, the internal standard. The calibration curve used peak areas, and the analyte peak areas were ratioed to the internal standard peak areas, and a linear fit with no weighting, was used. The calibration curve covers the wide range 0.5 pg/ul to 2000 pg/ul, and includes blanks. The curve is linear, with r=0.9979. FIG. 7 shows the same data as FIG. 6, but this time it is only analyzed over the range 0.5 pg/ul to 100 pg/ul, which is of much greater analytical interest. Over this smaller concentration range, the data has been re-analyzed and the calibration curve is, again, linear, with r=0.9957.

Figure 8:
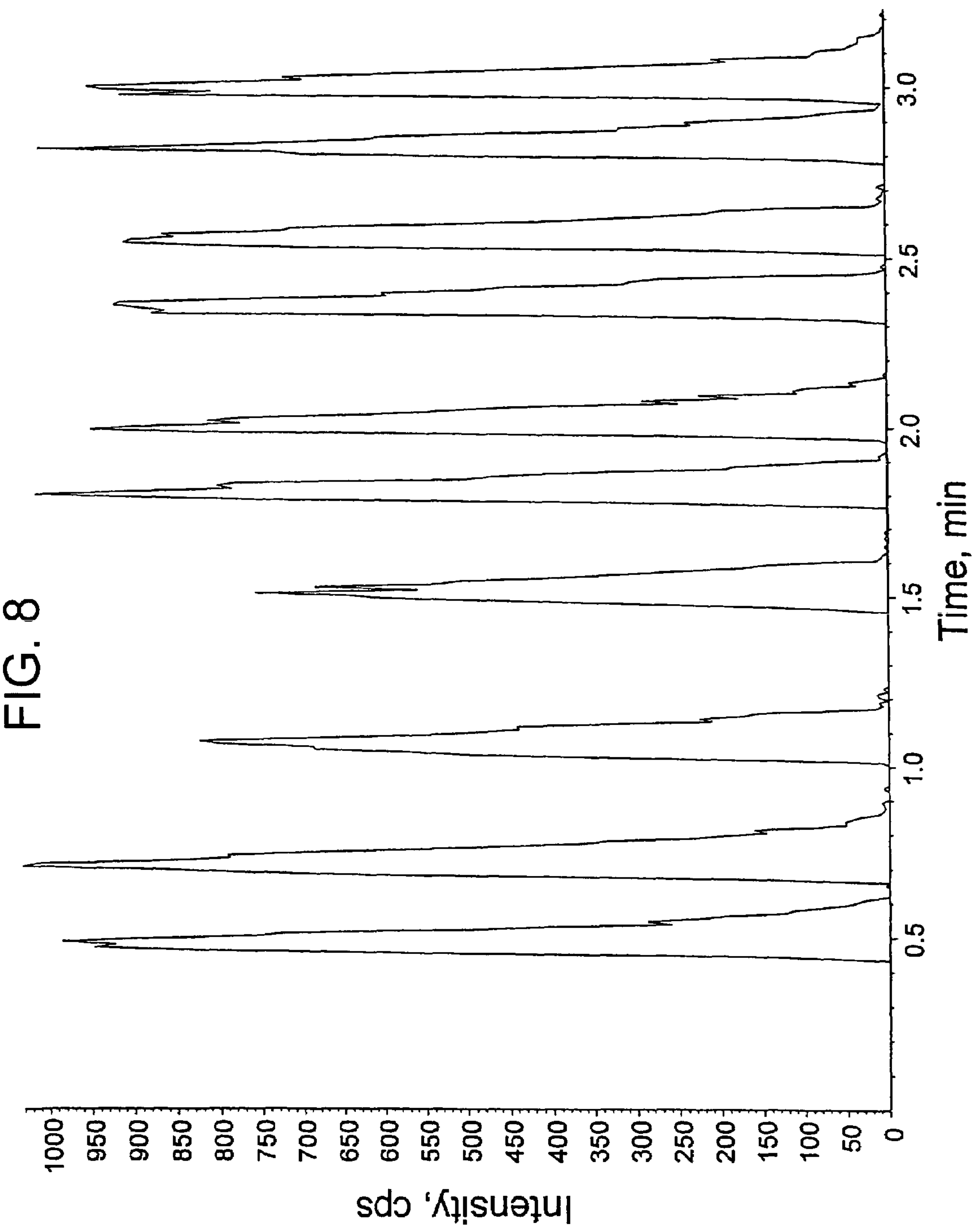
FIG. 8 is a chart showing exemplary data taken using a low laser pulse rate typically used in conventional MALDI/TOF mass spectroscopy.

As mentioned above, the laser pulse rate has a very significant influence on the possible speed of analysis, and hence on sample throughput. To provide a contrast, FIG. 8 shows MRM data taken with a Nitrogen laser operating at 40 Hz and a pulse energy of ~18 uJ per pulse. Even though this pulse rate is much lower than the laser pulse rate used in the technique described herein, it is actually "high" for conventional MALDI use. In this case, the laser was fired at two discrete locations on each of five sample spots. The analyte was 25 pg/ul Diltiazem (a commercially available compound), and 0.2 ul sample spots were used. Data were acquired using a 500 ms dwell time to monitor the 414.9/178.1 m/z ion pair. The average peak width is given by a Full Width at Half Maximum (FWHM) of 4.51 sec. This FWHM is much greater than the value of 130 msec for the 1400 Hz data in FIG. 5 (approximately 34 times as much). In general, for lower frequencies the use of higher pulse energies causes the sample to be ablated more rapidly, yielding narrow peaks and hence higher throughput possibilities than for low pulse energies at the same lower frequencies. However, higher laser pulse energies can cause increased molecular fragmentation in the ion source region and a resulting decrease in MS/MS sensitivity. The much narrower peaks provided by higher pulse rates offer the ability to acquire data in a much more high-throughput manner.

Figure 9:
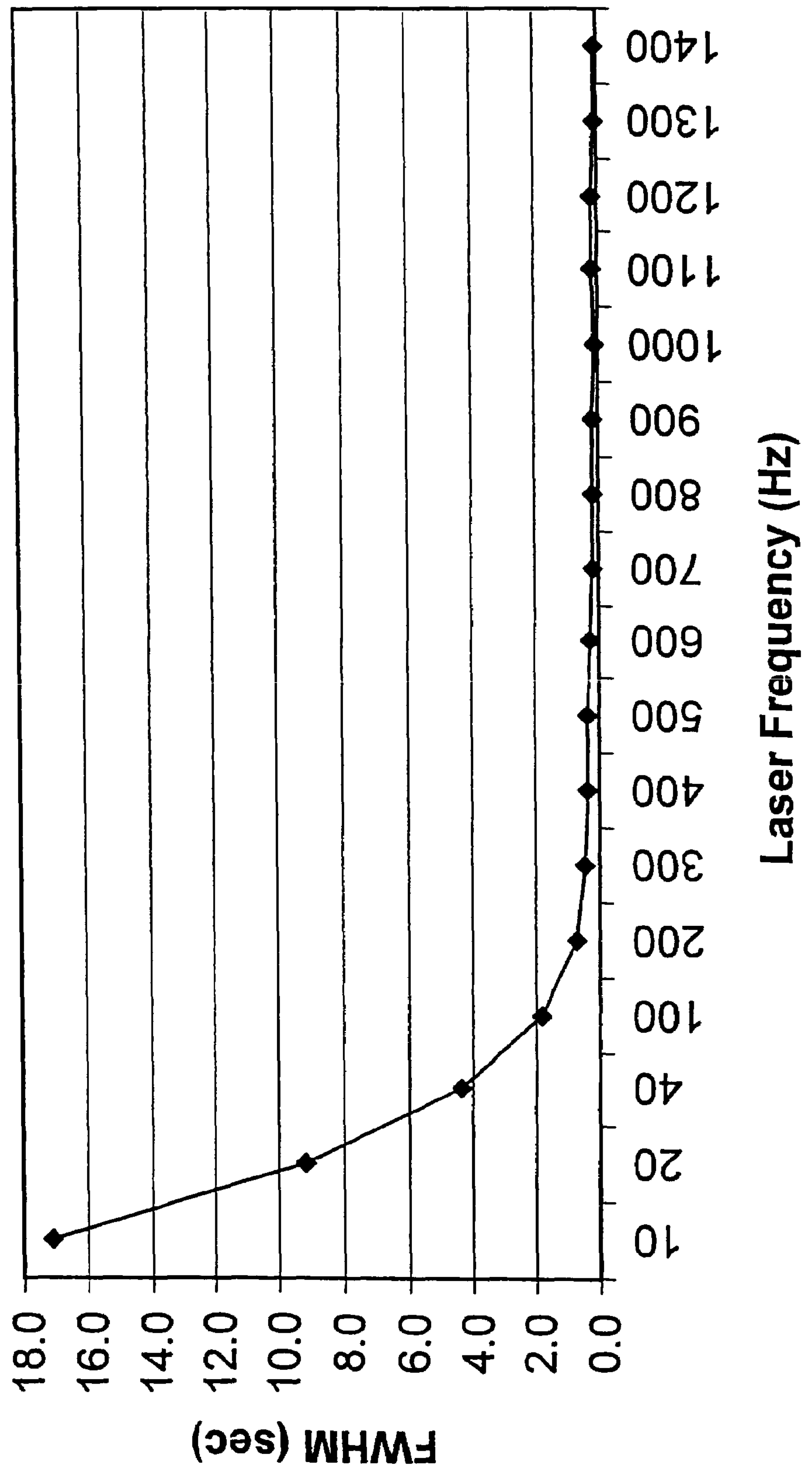
FIG. 9 is a chart showing the effect of laser pulse rate on the width of the MRM peaks.
Figure 10:
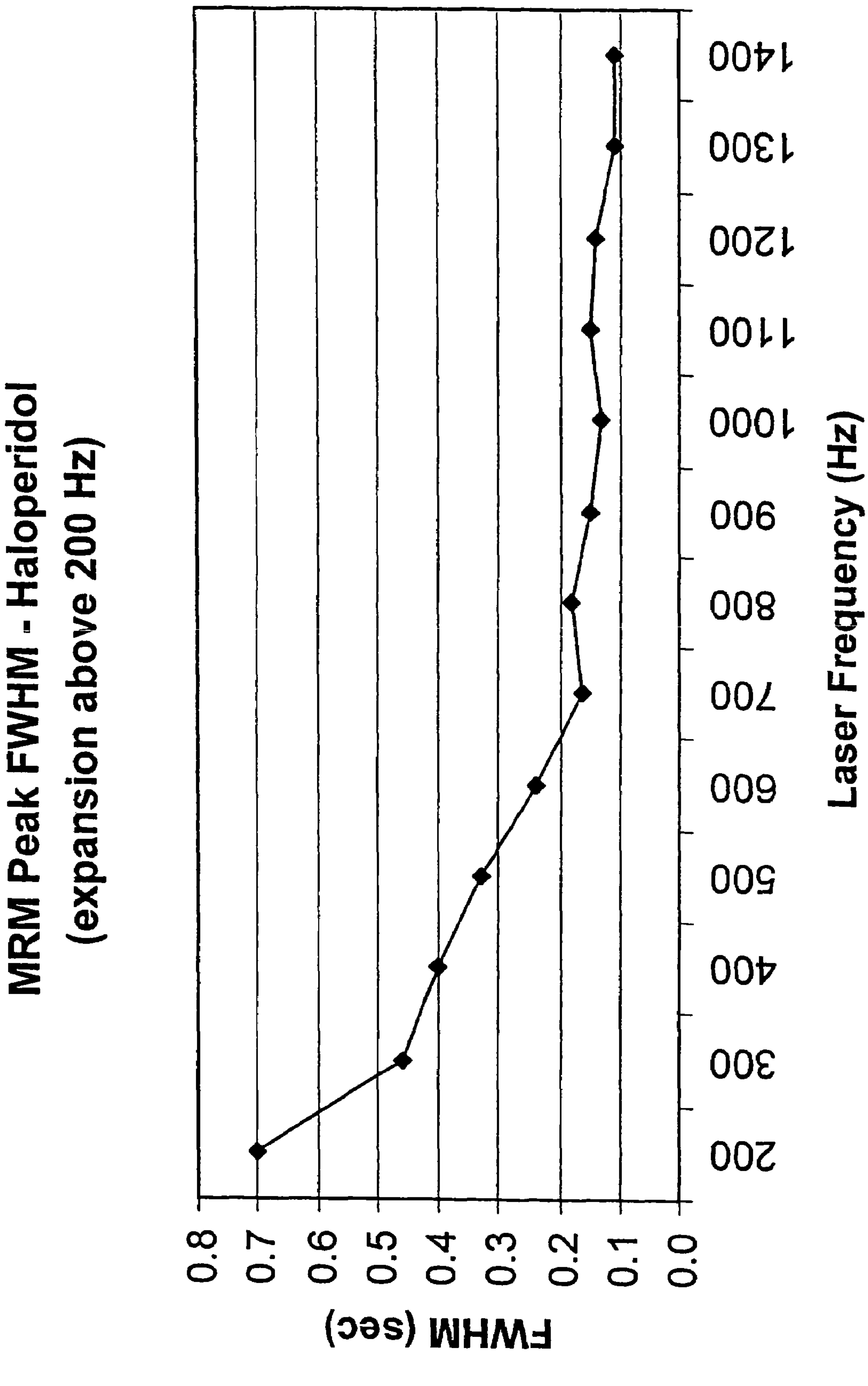
FIG. 10 is a chart showing a close-up view of a portion of the chart of FIG. 9.

FIG. 9 shows the effect of the laser pulse rate on the width of MRM peaks for Haloperidol. The laser pulse energy was kept fixed while the laser pulse rate was varied, and the FWHM was measured for each frequency. FIG. 10 is an expansion of the data shown in FIG. 9. The pulse width decreased from ~17 sec. at a laser pulse rate of 10 Hz to ~0.1 sec. at a laser pulse rate of 1400 Hz. This is a decrease of ~155 times, permitting much higher sample throughput.

Figure 11:
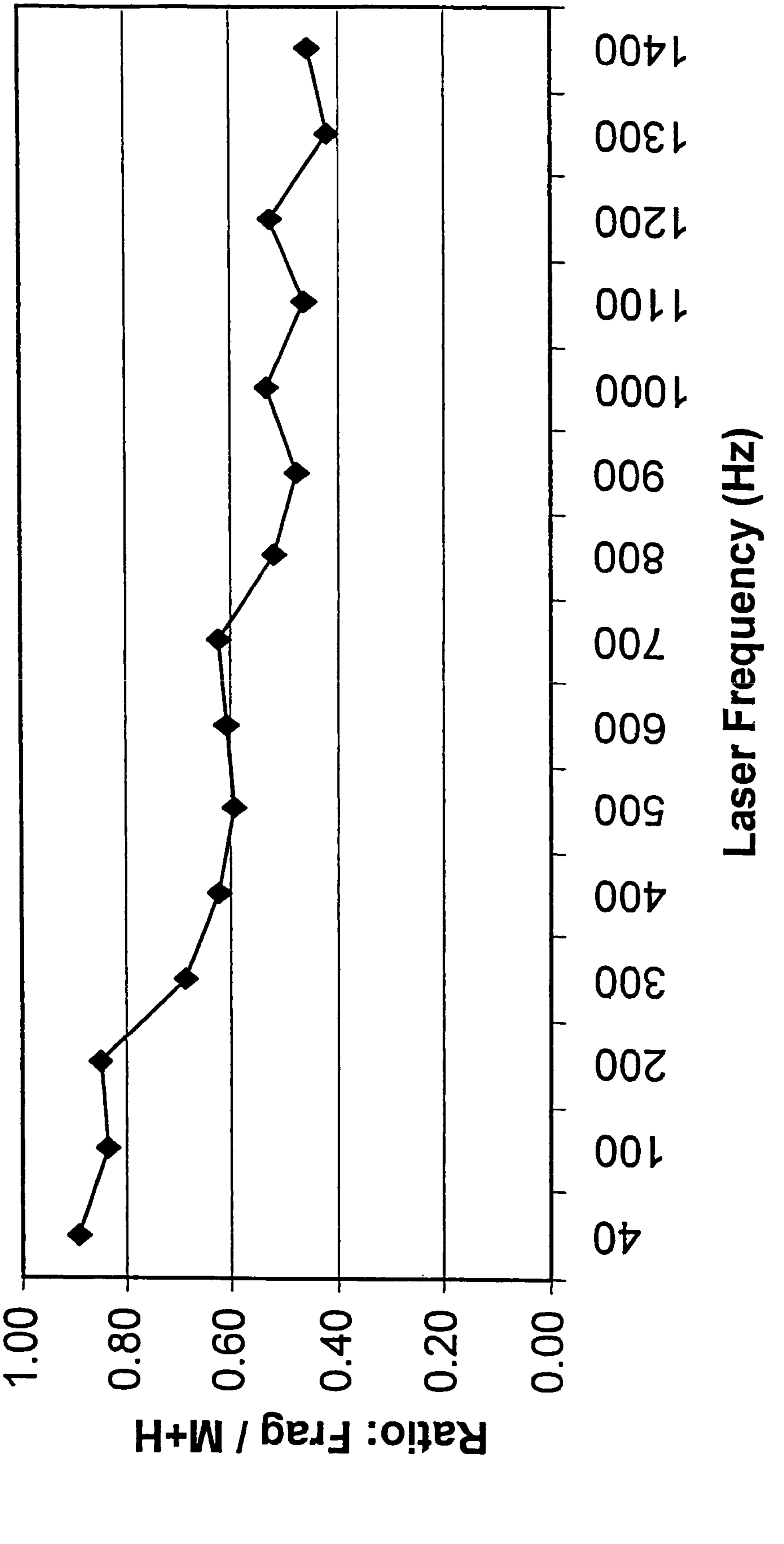
FIG. 11 is a chart showing an example of the ratio of the fragment ion intensity to the M+H intensity for Prazosin.

Higher laser pulse rates provide other benefits as well. Higher pulse rates at lower energy cause less molecular fragmentation in the ion source region that results in more precursor ions on which to perform MS/MS. Experiments were performed in which single MS Q1 spectra were taken as the laser pulse rate was varied. The intensity of the molecular ion (M+H) was measured as well as the intensity of the major fragment ion corresponding to M+H. FIG. 11 shows the ratio of the fragment ion intensity to the M+H intensity for Prazosin.

Figure 12:
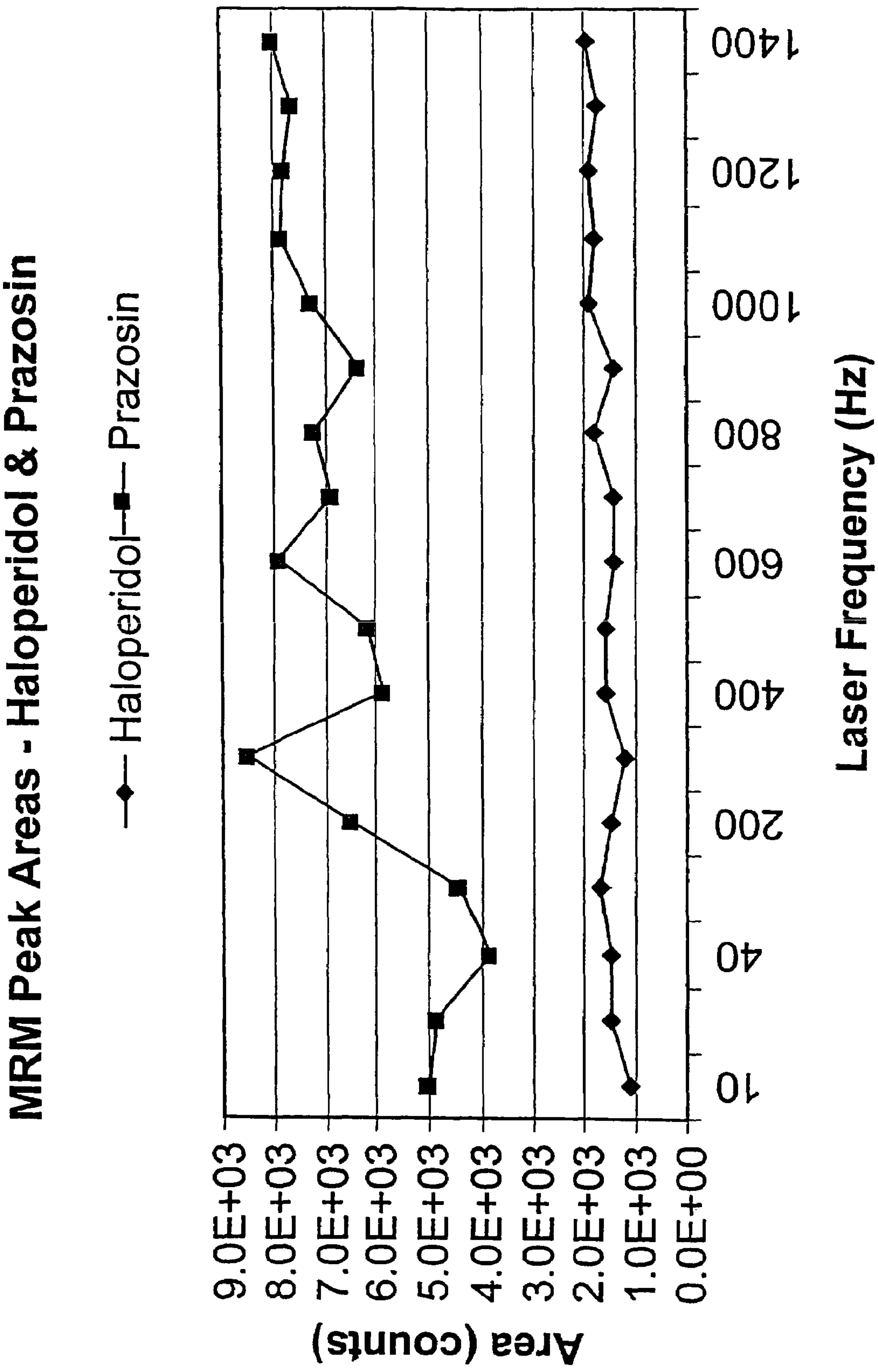
FIG. 12 is a chart showing examples of MRM peak areas as a function of laser pulse rate.

As the laser pulse frequency was varied the MS scan speeds were adjusted so that the same number of laser shots occurred for data taken at different frequencies. Molecular fragmentation was reduced by about a factor of two as the laser pulse rate was increased from 40 Hz to 1400 Hz. Since higher laser pulse rates cause less molecular fragmentation in the ion source, there is more molecular ion left intact on which to perform MS/MS experiments, such as MRM. FIG. 12 shows MRM peak area as a function of laser pulse rate, for Haloperidol and Prazosin. It is seen that there is a 60% to 100% increase in MRM peak area as the laser pulse rate was increased from 10 Hz to 1400 Hz.

This quantitation technique described above offers several advantages over both conventional MALDI/TOF and orthogonal MALDI/TOF (or MALDI QqTOF). First, the sensitivity is significantly improved over MALDI QqTOF because of the high sensitivity of the triple quadrupole in MRM mode, compared to that of a QqTOF. In the QqTOF, significant ion losses are encountered due to duty cycle limitations of the orthogonal TOF method, which only samples a portion of the ion beam (with the efficiency being lower at low mass than at high mass). Experience has shown that the absolute sensitivity or efficiency is 10 to 50 times better with MRM in a triple quadrupole than with the equivalent experiment on a QqTOF.

A second advantage is provided by the fact that MS/MS is a very specific detection technique, in which chemical noise background is usually very low. This is because only specific precursor/product ion combinations are monitored. In MALDI/TOF (where there is no efficient MS/MS capability), the chemical noise is usually high, especially at low mass. This chemical noise is due to matrix-related ions that are present in high abundance, and can obscure the signal from low-mass analyte ions. Therefore, the MS/MS capability of the triple quadrupole can allow the sensitive detection of even low mass ions that are present at much lower intensity than the matrix-related ions. Furthermore, MALDI/TOF has such a large ion flux that a transient recorder detection system must be used. This has the disadvantage of being somewhat noisy, so that single-ion events may not be detected. With the MALDI/MRM technique, the pulses are stretched out in time so that the ion flux is much lower, even if the same number of ions per pulse are received, so that a time-to digital converter can be used for ion detection by pulse counting. This benefits MS/MS, since the noise levels are very low.

Thirdly, the fact that the mass spectrometer performance (in this case, the triple quadrupole) is independent of the sample morphology, allows the possibility of rapidly desorbing the sample from the surface, in order to improve the rate at which samples can be analyzed. In previous axial -MALDI/MS, the laser fluence must be kept low, near the ionization threshold, in order that the mass resolution and mass accuracy are not significantly affected. However, because of collisional cooling of the ion beam, the laser energy can be increased to the point just below that at which sample thermal degradation occurs. This can allow more rapid desorption of the sample, and therefore allow more samples to be processed in a short period of time. Furthermore, the fact that the mass spectrometer analytical performance is independent of the sample morphology means that a larger region of the sample can be ionized at one time, by using a larger diameter laser beam. Inhomogeneities in the sample will have no effect on the mass spectrometer performance (mass resolution or mass position), in contrast to the situation with MALDI/TOF. Furthermore, the quasi-continuous nature of the ion beam allows the use of pulse counting methods (since the ion flux is still rather weak). Pulse-counting is inherently the most noise-free detection method for MS/MS, allowing the best signal-to-noise ratio. However, any known method for detecting the presence of the ions is possible.

The combination of a collisionally cooled MALDI ion source with a triple quadrupole in MRM mode and with high laser pulse rates therefore provides a very sensitive and rapid technique for the quantitative analysis of biological and pharmaceutical samples of small molecules. The ability to prepare samples off-line, and deposit them on sample plates means that methods of parallel sample processing can be used to extract and clean-up multiple samples off-line. Since generally the mass spectrometer is the most expensive part of the analytical system, the ability to prepare the samples for analysis in a batch mode, significantly improves the efficiency of the process.

In accordance with a feature of the present invention, very high throughput of the quantitation operation is obtained by illuminating each sample spot on the target with laser light for a duration that is significantly shorter than the time required to deplete the sample material in that spot. The throughput achievable with this technique can be much higher than even the throughput obtained using the pulsed laser mode of operation described above. In this configuration, the laser used for ion generation may be a continuous laser that is turned on for a selected short duration over a given sample spot and then turned off. Alternatively, the laser light may be pulses, and the total irradiation duration of the laser pulses is controlled to be significantly shorter than that needed to deplete the sample spot. Irrespective of whether the laser is pulsed or continuous, the irradiation duration is defined as the duration or time for which the laser light illuminates the selected sample spot or area. As described above, the laser light can be pulsed or remain on while the sample plate can be moved relative to the laser light in a predetermined or a random pattern, in order to bring a new region of sample into the path of the laser light for the irradiation duration. It can be appreciated that the pattern of movement can be accomplished in discrete steps, continuous motion or a combination thereof. For example, the sample plate can be moved in such a pattern as to allow the laser light to raster and follow the sample trace deposited from a liquid chromatography output. This feature of the invention is based on the unexpected result that the widths of the MRM peaks are significantly reduced when the laser irradiation duration is significantly shorter than the time required for sample depletion, without significantly affecting the signal/noise ratio. Due to the significant reduction of the MRM peak width obtained in this way, the time period required for taking data at each sample spot is significantly reduced. As a result, the measuring apparatus can go through the sample spots on the MALDI target at a much higher rate, resulting in significantly improved throughput. As used herein, the term “throughput” means the number of sample spots that can be analyzed in a given time period.

Figure 13:
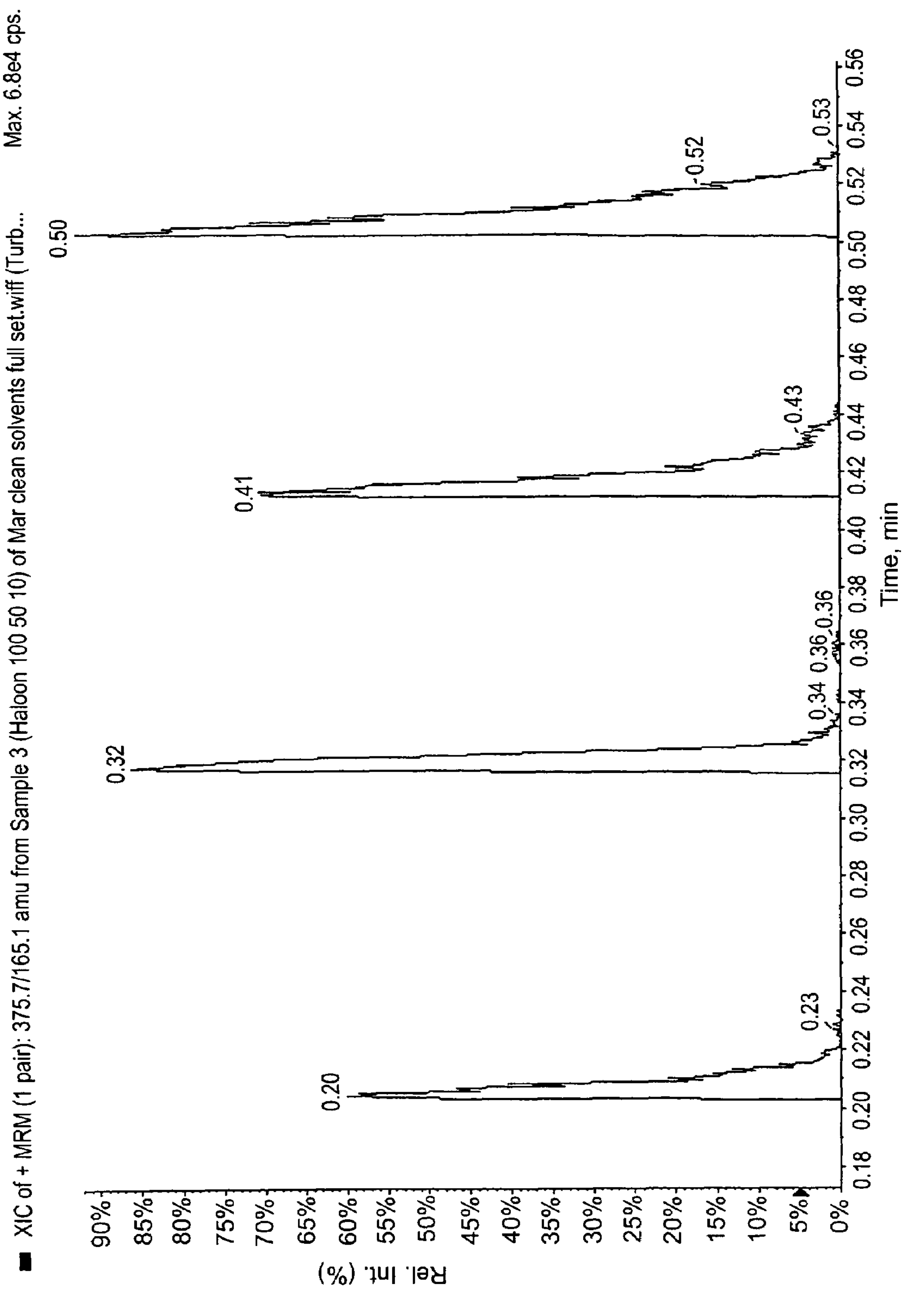
FIG. 13 is a chart showing MRM peaks taken on a MALDI sample target with the laser irradiation duration set to deplete the sample spots.
Figure 14:
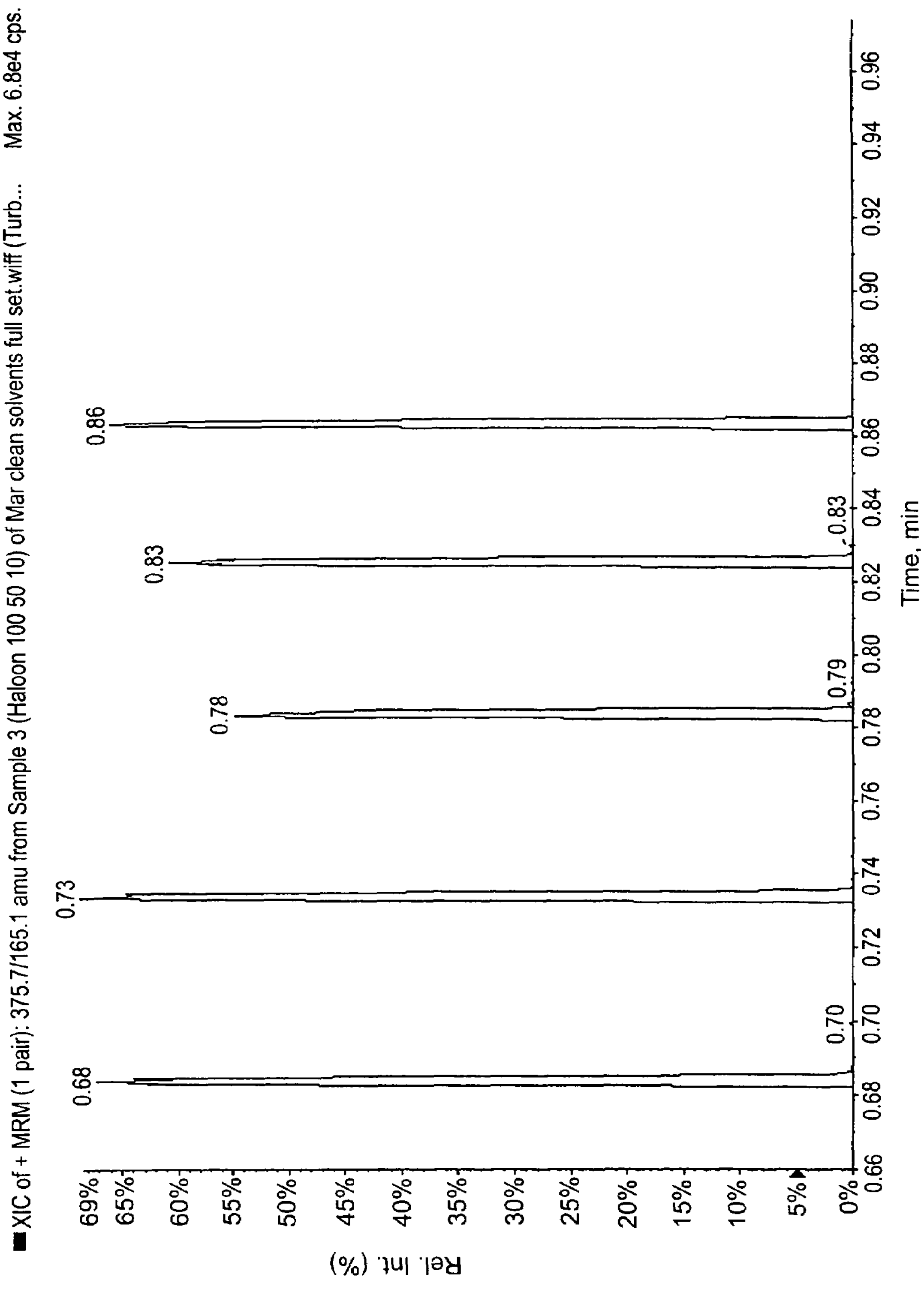
FIG. 14 is a chart showing MRM peaks taken on a MALDI sample target with the laser irradiation duration set at 100 ms.
Figure 15:
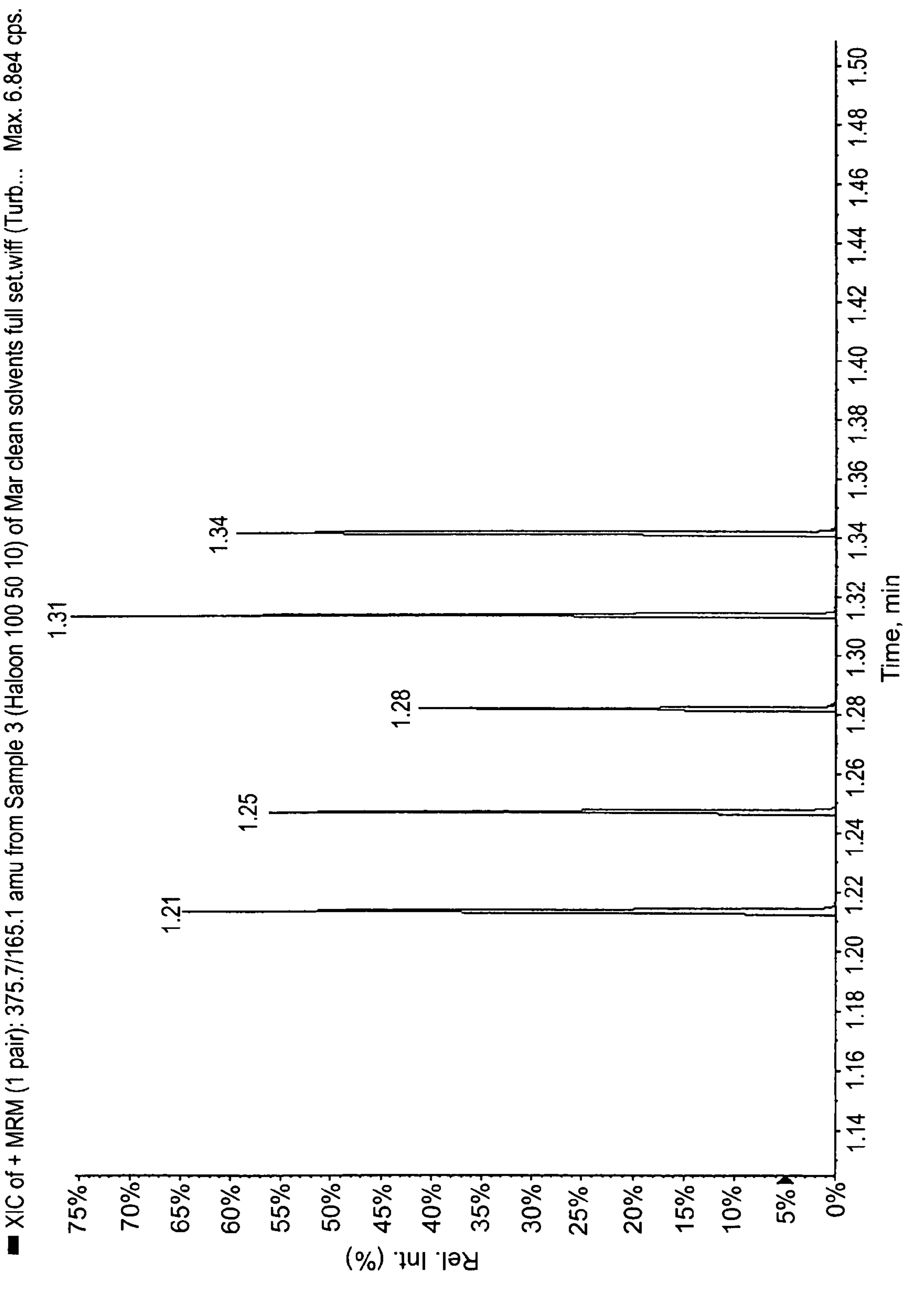
FIG. 15 is a chart showing MRM peaks taken on a MALDI sample target with the laser irradiation duration set at 10 ms.

By way of example, FIGS. 13, 14, and 15 show MRM peaks taken on a sample target containing the compound Haloperidol. In these figures, each MRM peak represents the count rates (as a function of time) of ions taken from one sample spot in that sample target. For each sample spot, the continuous laser is turned on for a selected duration and then turned off. The MRM peaks in FIG. 13 are taken by leaving the laser on until the sample material in each corresponding sample spot is depleted. As can be seen from the plot, the full base widths of these MRM peaks are on the order of one second or greater. FIGS. 14 and 15 show MRM peaks taken with significantly shorter laser durations. Specifically, the MRM peaks in FIG. 14 are taken with a laser illumination duration of 100 ms, which is about or less than 10% of the normal time required for sample depletion, and the MRM peaks in FIG. 15 are taken with a laser illumination duration of 10 ms, which is about or less than 1% of the time required for sample depletion. It can be seen that the widths of the MRM peaks in FIGS. 14 and 15 are much smaller that those in FIG. 13. Also, it can be seen that the peaks with sample depletion as shown in FIG. 13 have relatively sharp leading edges but rather extended tails. The shape of these MRM peaks suggests that there is an initial rapid analyte desorption from the sample spot, followed by a decreasing rate of analyte liberation from the sample target. In contrast, such extended tails of the peaks in FIG. 13 are eliminated from the MRM peaks generated with a reduced duration of laser illumination as shown in FIGS. 14 and 15.

An important advantage of generating MRM peaks using laser illumination of a reduced period is that the signal/noise ratio remains high even though the total number of ion counts may be lower. This is because using a laser irradiation duration shorter than that required for sample depletion appears to reduce both the MRM peak area (i.e., total number of ion counts) for the analyte and the background area. By way of example, Tables 1 and 2 show representative data for Ketoconazole (Keto) and Prazosin (Praz), respectively. In each table, the data were taken using four different durations of laser irradiation: continuously on until sample depletion, 100 ms, 50 ms, and 10 ms.

TABLE 1

Irradiation time experiments for Ketoconazole

| Laser On Time (ms) | Area Signal (counts) | Background (counts) | S/N |
|---|---|---|---|
| Left On | 3310 ± 895 | 12.5 ± 6.1 | 265 |
| 100 ms | 1520 ± 369 | 10.7 ± 6.1 | 142 |
| 50 ms | 1160 ± 228 | 7.8 ± 5.3 | 149 |
| 10 ms | 731 ± 174 | 4.8 ± 4.3 | 152 |

TABLE 2

Irradiation time experiments for Prazosin

| Laser On Time (ms) | Area Signal (counts) | Background (counts) | S/N |
|---|---|---|---|
| Left On | 36000 ± 10909 | 66.1 ± 29.0 | 545 |
| 100 ms | 19900 ± 2840 | 29.3 ± 6.6 | 679 |
| 50 ms | 16700 ± 2533 | 21.7 ± 8.4 | 770 |
| 10 ms | 10100 ± 1700 | 15.1 ± 6.3 | 669 |

To further illustrate the effect of reducing the laser irradiation time on the MRM peak area (i.e., total number of ion counts), Table 3 shows data of peak areas taken on a sample target containing Prazosin, with the laser irradiation durations varied between “left on,” 500 ms, 100 ms, and 10 ms. With the irradiation time set at 500 ms, which is about half or less than of the time it typically takes to deplete a sample spot, the peak area is 88% of that obtained by depleting a sample spot. In this regard, a 50% reduction of the irradiation time is considered to be a significant and substantial reduction. With a laser duration of 100 ms, which is close to the peak broadening introduced due to the transfer of the ions from the point of ablation to the detector (as will be shown below), the peak area is nearly 50% of the peak area obtained by leaving the laser on until sample depletion. Even with the laser irradiation duration as short as 10 ms, the peak area is about a quarter of that of sample depletion. Thus, even with a laser irradiation duration that is much shorter than the ion transfer broadening, data acquisition with a high signal/noise ratio can be performed. The small peak width of the MRM peaks allows the measurement system to move from one sample spot to the next quickly, resulting in a drastically improved measurement throughput.

TABLE 3

Effect of irradiation time on total peak area for 500 pg Prazosin

| Laser Irradiation Time (ms) | Praz Peak Area (counts) | Percent of Max Signal (%) |
|---|---|---|
| Left On | 1050000 ± 189000 | 100 |
| 500 ms | 920000 ± 165000 | 88 |
| 100 ms | 547000 ± 72885 | 52 |
| 10 ms | 280000 ± 37473 | 27 |

To demonstrate that very short irradiation time durations are not detrimental to quantitation, a series of calibration cures are calculated for Praz (10 pmol-500 pmol) using 25 pmol Keto as an internal standard. Table 4 and Table 5 present the ratio of Prazosin/IS signal at various concentrations and the calibration curves with various irradiation times, respectively. These tables contain data taken with an irradiation period varying from left on to approximately 10 ms, which is about 1% of or less than the typical time required for sample depletion (operating at a repetition rate of 1000 Hz). The data in Tables 4 and 5 demonstrate that very similar calibration curves were generated regardless of the irradiation time. Similar calibration curves mean it is still possible to carry out quantitation experiments due to linearity of the analyte response.

TABLE 4

Calibration curve data for Prazosin

| Amount of Praz (pg) | Laser Left On | 500 ms irradiation | 100 ms irradiation | 10 ms irradiation |
|---|---|---|---|---|
| 10 | 17.0 ± 1.2 | 17.4 ± 1.1 | 17.3 ± 1.2 | 16.3 ± 1.9 |
| 25 | 30.7 ± 2.7 | 30.1 ± 1.9 | 31.3 ± 4.3 | 30.6 ± 4.3 |
| 50 | 56.7 ± 2.6 | 56.9 ± 3.0 | 56.1 ± 5.2 | 61.4 ± 6.9 |
| 100 | 98.4 ± 9.2 | 97.2 ± 10.3 | 96.8 ± 12.4 | 100 ± 13 |
| 500 | 386 ± 33 | 385 ± 34 | 358 ± 31 | 366 ± 41 |

TABLE 5

Calibration curves for Prazosin

| Laser Irradiation Time (ms) | Slope of Calibration Curve | Intercept | $R^2$ |
|---|---|---|---|
| Left On | 0.7439 | 15.568 | 0.9988 |
| 500 ms | 0.7417 | 15.709 | 0.9987 |
| 100 ms | 0.6836 | 18.246 | 0.9975 |
| 10 ms | 0.6985 | 19.16 | 0.9962 |

Figure 16:
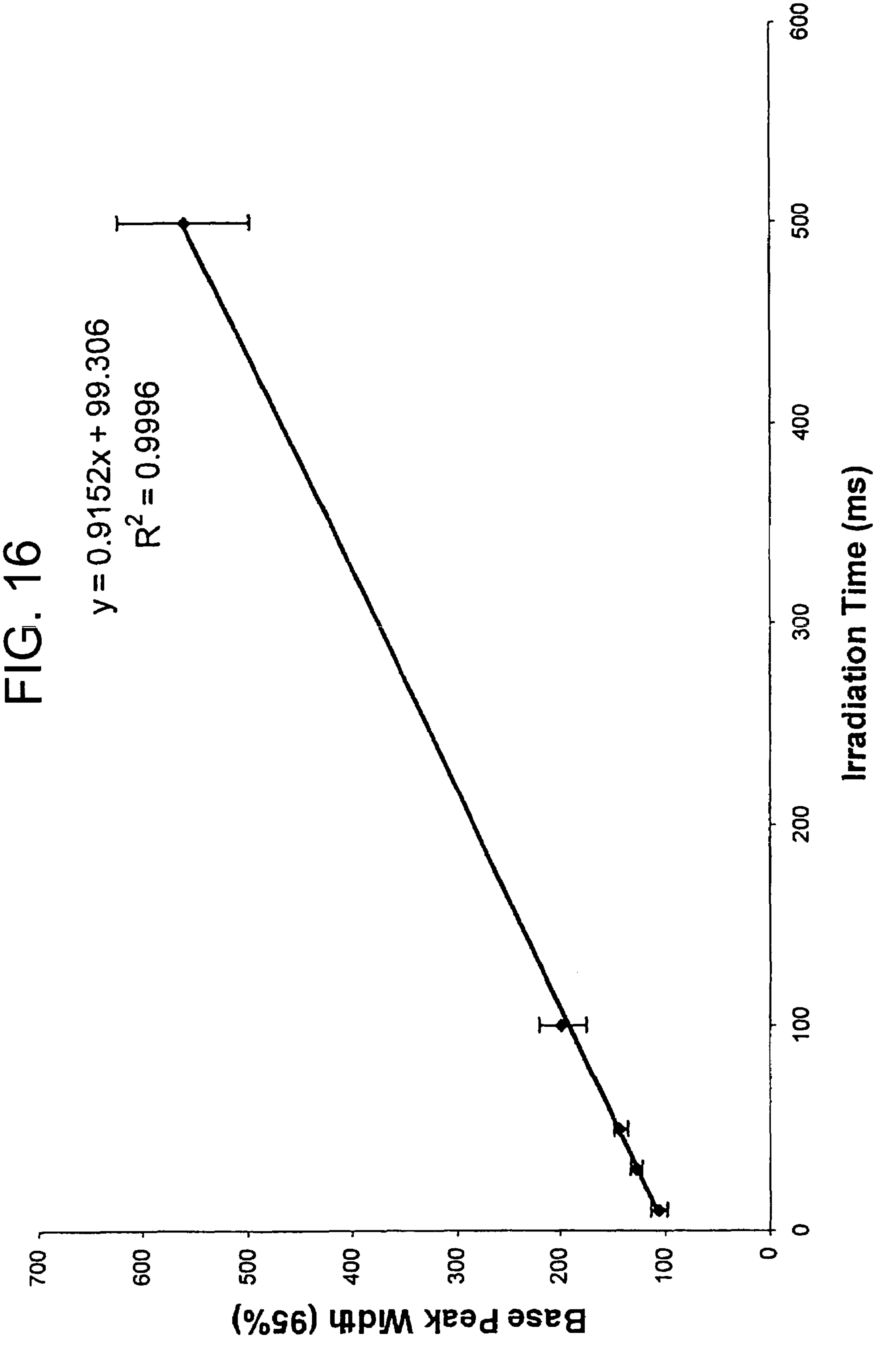
FIG. 16 is a chart showing measured MRM peak widths plotted as a function of laser irradiation durations.

In accordance with an aspect of the invention, the observed MRM peak base width depends on both the laser irradiation time and the broadening introduced during ion transfer when the ions are transported from the point of ablation to the detector. For example, the focusing effects (or defocusing) of the various ion optics, as known in the art, can contribute to the ion transfer broadening. Also, the background gas pressure along the path between the point of ablation and the detector can contribute to the broadening. It will be appreciated however, the background gas pressure, due to added collision gas or due to the nature of the laser ablation process as known in the art, can be effective for collisional damping. The collisional damping of the ions that can be effective in reducing the amount of ion fragmentation. Generally, the broadening by the ion transfer presents a lower limit for the peak width. This is illustrated in FIG. 16, which shows a plot of collected data for samples of the drug Quinidine (Quin) with various laser irradiation times. The data presented in FIG. 16 shows that there is a direct relationship between the duration of laser irradiation on the sample and the observed MRM peak widths. Thus, the control of the laser irradiation time is a critical aspect for a MALDI quantitation system, which is a factor that has not been considered in prior art systems.

In addition, the plot in FIG. 16 shows that another main source of peak broadening appears to be the time spread induced when the ions travel through the ion optics of the system. By way of example, an extrapolation of the plot to an irradiation time of 0 second should give the peak broadening due to the ion transfer used for taking the data for this plot. The ion optics used in this example are similar to those shown in FIG. 3. In this example, for ions of Quin, the MRM peaks widths are not expected to be significantly narrower than approximately 99 ms with the given measurement configuration, regardless of the laser irradiation time used. It will be appreciated that the magnitude of peak broadening caused by the ion transfer depends on the particular measurement configuration used, and the broadening may also show small variations depending on the particular ions to be studied.

Significant improvements of the measurement throughput are expected by choosing the laser irradiation time to be comparable in magnitude to the broadening due to the ion transfer. More preferably, the laser irradiation time may be chosen to be about the same or shorter than the peak broadening of the ion transfer. By way of example, a laboratory scientist may first determine the peak broadening caused during the transfer of ions through the MALDI/MRM setup for a particular ion sample by performing an analysis similar to that shown in FIG. 16 to determine the broadening caused by the ion transfer. A laser irradiation duration for the subsequent MRM quantitation may then be set at a value based on the determined ion transfer broadening to achieve a desired throughput. For instance, if the broadening of the ion transfer is around 100 ms, the laser irradiation duration for each sample spot may be set at around 100 ms to achieve a good balance between the throughput, the total number of counts of each sample spot, the time spent on each sample spot, and the signal/noise ratio.

An example of the forgoing can be seen in Table 6 which shows five separate peak width measurements taken from each of 3 separate sample spots (areas) (n=15) with various irradiation times for 5 different compounds.

TABLE 6

MRM base peak widths (ms) with various irradiation times

| Sample | Left On | 100 ms | 50 ms | 10 ms |
|---|---|---|---|---|
| Clonidine | 642 ± 196 | 194 ± 10 | 145 ± 18 | 111 ± 8 |
| Haloperidol | 985 ± 386 | 199 ± 6 | 152 ± 14 | 107 ± 10 |
| Ketoconazole | 643 ± 51 | 187 ± 9 | 151 ± 10 | 114 ± 8 |
| Prazosin | 734 ± 266 | 201 ± 6 | 147 ± 9 | 111 ± 10 |
| Quinidine | 954 ± 150 | 201 ± 5 | 141 ± 5 | 109 ± 6 |

The irradiation duration varied from "Left On" (laser left on until no further signal detected from the spot area) down to an extreme of 10 ms. There was a dramatic reduction in the MRM peak widths when the laser irradiation time was reduced. The MRM peak widths were 5.5-9 times narrower when the sample was irradiated for 10 ms. These data show that the current sample throughput can be improved by approximately a factor of 9 for Haloperidol (ignoring the effects of stage translation time). In addition to a dramatic throughput improvement, the data in Table 6 demonstrate that the base peak width reproducibility was also very substantially improved when the laser was toggled on/off. The average RSDs for the 5 drugs were 26%, 4%, 8%, and 8% when the laser was left on, and operated for 100 ms, 50 ms, and 10 ms, respectively. A final advantage associated with short irradiation times was significant reduction of compound-dependence for the observed peak widths. Leaving the laser on until signal depletion gave noticeable differences in base peak widths for various compounds, however, these differences were eliminated when irradiating for short periods.

Figure 17:
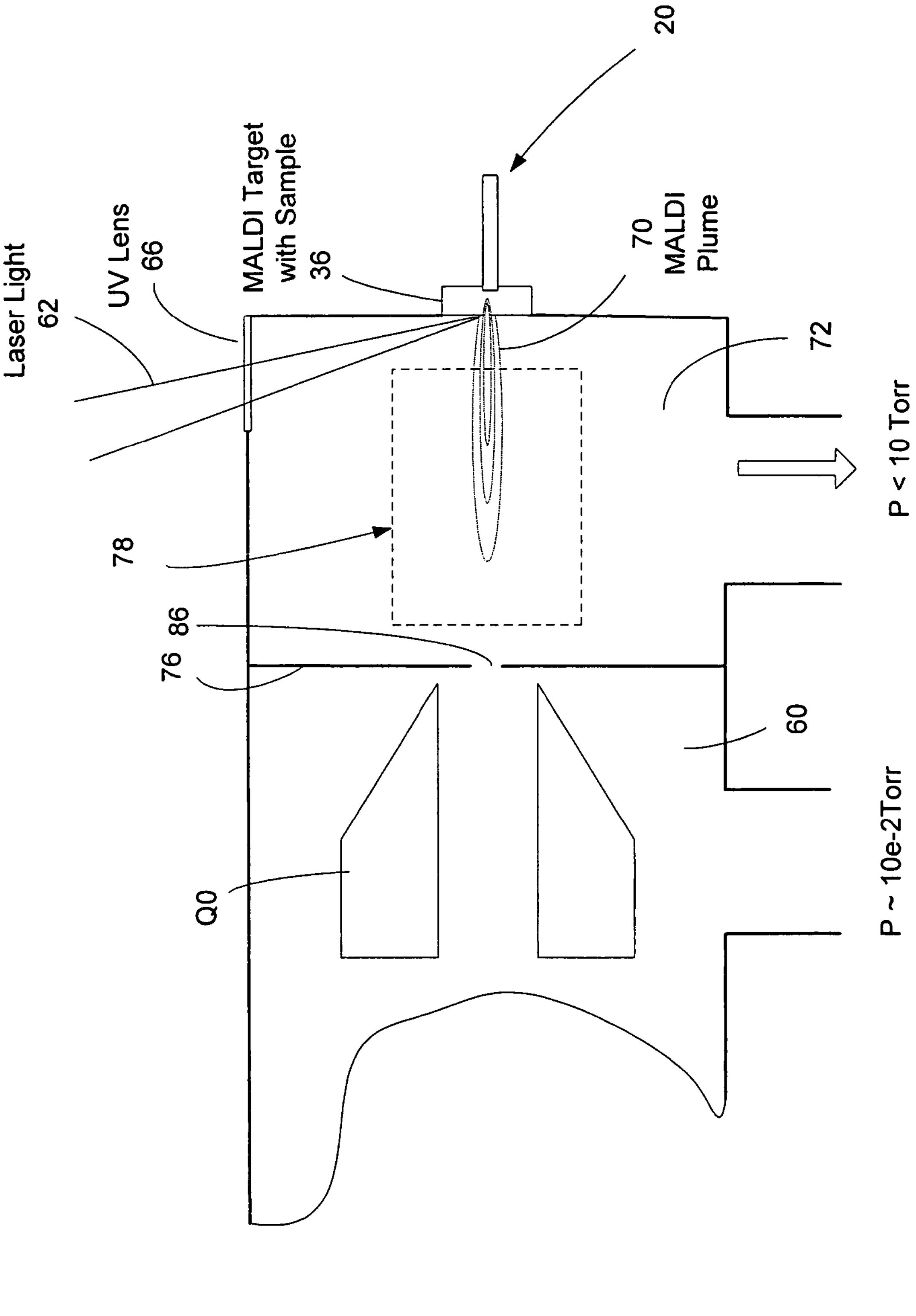
FIG. 17 is a schematic view of an enhanced MALDI source that uses an ion guide to increase the coupling of ions from the ion target to a downstream vacuum stage.

In accordance with a feature of the invention, FIG. 17 shows a configuration of an improved ion source that uses an RF multipole ion guide 78 in a high pressure region 72 to capture the ions in a plume 70 coming off the MALDI target 36 and guide the ions so that they pass through the aperture 86 into the next vacuum chamber 60. In doing so, the ion guide 78 significantly increases the number of ions that can reach the ion mass analyzer, thereby enhancing the measurement sensitivity of the system.

The vacuum chamber 72 housing the MALDI target 36 and the ion guide 78 is maintained at a pressure that is selected to provide effective damping of the ions in the plume 70 generated by a laser pulse. The pressure of the damping gas in the first chamber 72 is typically significantly higher than the low pressure required for effective operation of the ion mass analyzer. The damping gas pressure in the vacuum chamber 72 is indicated in FIG. 17 as being less than 10 Torr. Generally, the damping gas pressure in the first vacuum chamber 72 may be on the order of about one Torr, and preferably between 0.1 and 10 Torr.

It will be appreciated that the ion guide 78 can include, but is not limited to, one or more individual ion guides. Generally, the ion guide 78 can be one or more multipole ion guides or ring guides as known in the art, or a combination thereof. Furthermore, the ion guides can be configured to have similar vacuum pressures. Alternatively, the ion guides can be configured so that each ion guide can have a different vacuum pressure, typically by various methods including having additional differentially pumped regions (not shown) or using conductance limiting to achieve the vacuum pressure difference.

Figure 18:
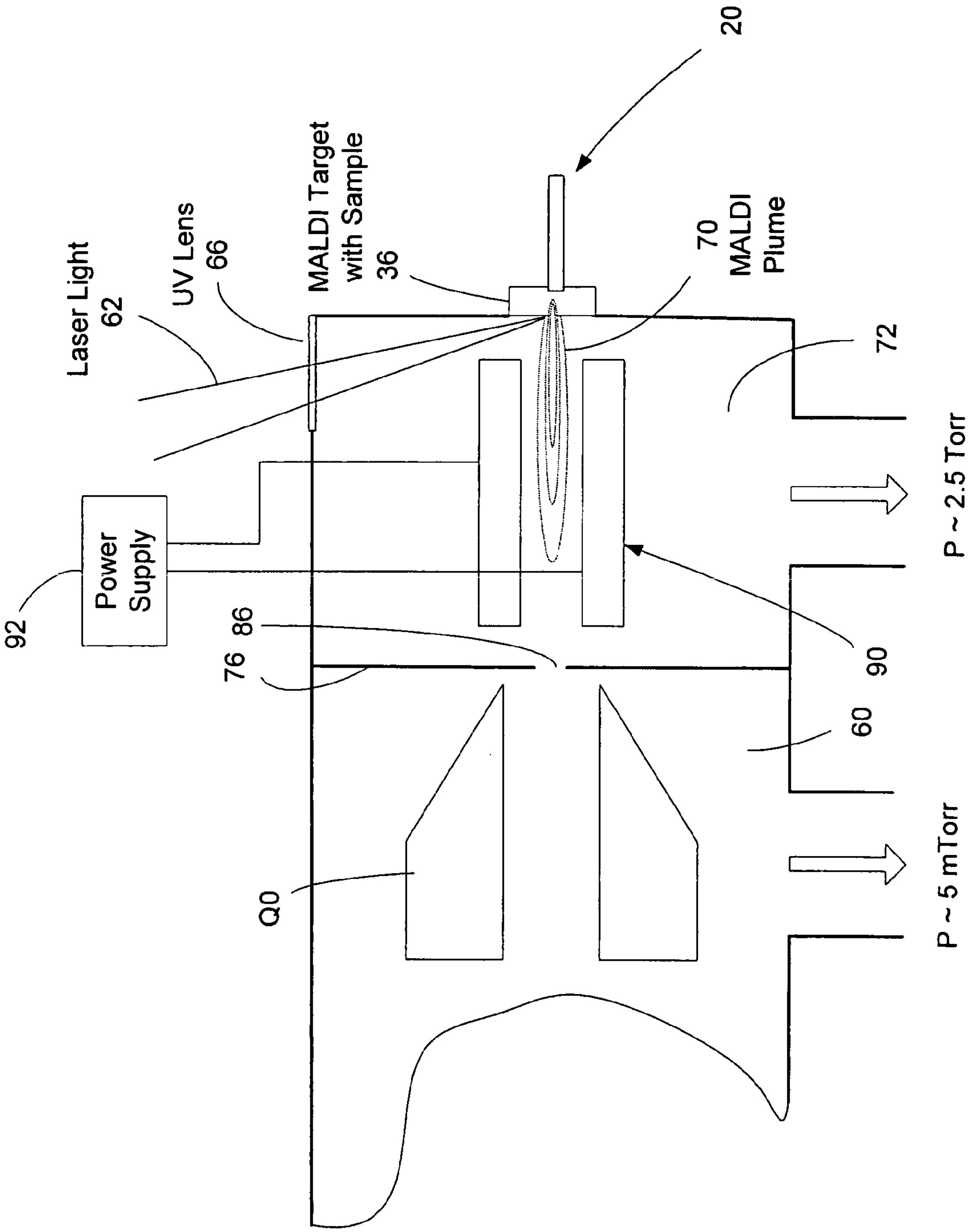
FIG. 18 is a schematic view of an embodiment of an enhanced MALDI source that uses a quadrupole ion guide to capture ions in a MALDI plume and guide the ions to a downstream vacuum stage.

FIG. 18 shows an improved MALDI source based on the concept shown in FIG. 17. In the embodiment shown in FIG. 18, the ion guide for capturing and guiding the MALDI ions is a quadrupole ion guide 90. The MALDI target 36 is disposed in a first vacuum chamber 72, which is separated from a second vacuum chamber 60 by a wall or partition 76. The partition wall 76 has an aperture 86 disposed on the line extending from the MALDI target 36 to the second chamber 60 to allow ions in a plume 70 from the MALDI target 36 to enter the second chamber 60 and ultimately reach an ion mass analyzer. The second vacuum chamber 60 may contain the ion mass analyzer. Alternatively, the second vacuum chamber 60 may contain an ion transport device that transports ions to the ion mass analyzer, which may be disposed in another vacuum chamber downstream from the second vacuum chamber 60. The mass analyzer may be, for example, a triple-quad analyzer as described above. In the example shown in FIG. 18, the second chamber contains a quadrupole RF ion guide Q0, which may be used with the triple-quad analyzer formed by the quadrupole ion guides Q1, Q2, and Q3 as in embodiments discussed earlier. In that combination, the quadrupole Q0 provides collision cooling to the ions while transporting them to a downstream vacuum chamber containing the triple quadrupole analyzer for MRM analyses. The high pressure in the vacuum chamber 72 provides effective cooling to the ions transported by the ion guide 90 and contributes to the peak broadening of the ions in the plume 70 in addition to the peak broadening effect provided by the ion guide Q0.

The quadrupole RF ion guide 90 is disposed between the MALDI target 36 and the aperture 86, and has its axis aligned with the line connecting the MALDI target and the aperture 86. The dimension of the opening of the quadrupole ion guide 90 for accepting ions is selected to be large enough to receive a substantial portion, preferably 50% or more, of the plume of ions emitted from the MALDI target 36 by a laser pulse. In one implementation, the quadrupole ion guide 90 has a predetermined cross-section characterized by an inscribed circle with a diameter of about 4 mm, with a rod length of about 5 cm. The aperture 86 has a diameter of about 1.7 mm. It will be appreciated that these dimensions can be adjusted according to factors such as the width and angle of the plumes, the aperture diameter, pressure, etc., to optimize the coupling of the ions to the next stage. In various embodiments, the inscribed diameter of the quadrupole ion guide 90 can be about 1 cm to provide sufficient focusing and transmission of the ions to the aperture 86. The rods of the quadrupole RF ion guide 90 may have various shapes including round or hyperbolic, and the diameter of each rod may be chosen to optimize performance. A power supply 92 provides RF voltages for operating the rods of the quadrupole RF ion guide 90 such that the ions are focused and guided to go through the aperture 86 into the next vacuum chamber 60. Even though FIG. 18 shows, by way of example, the quadrupole ion guide Q0 in the second vacuum chamber, it should be appreciated that the MALDI source with enhanced ion sampling efficiency by means of ion guide coupling is not limited to such a configuration, and the second vacuum chamber 60 may contain other types of ion transport devices or mass analyzers.

Figure 19:
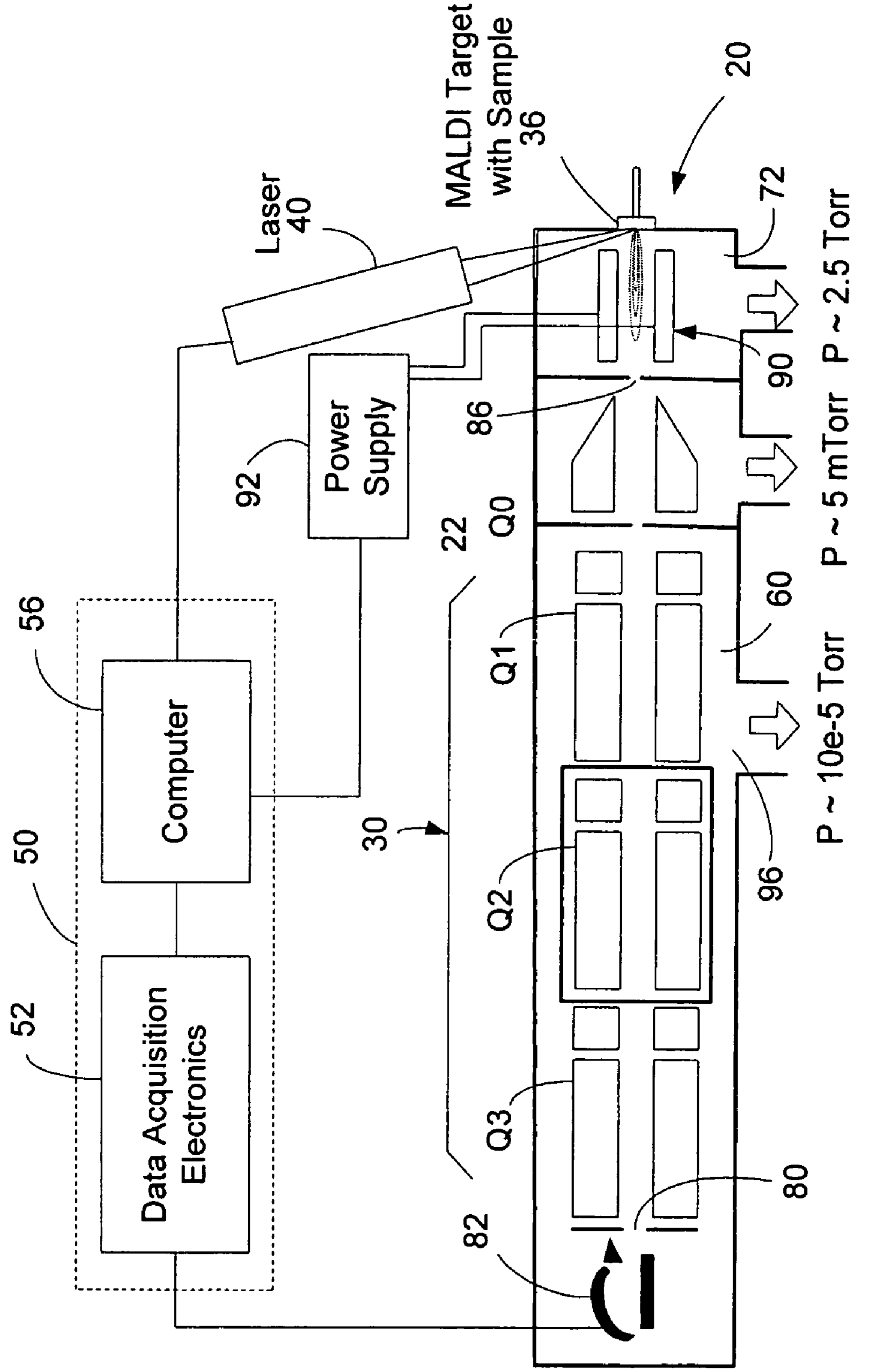
FIG. 19 is a schematic view of the MALDI source of FIG. 18 used together with a triple-quadrupole analyzer for MRM scans.

By way of example, FIG. 19 shows the MALDI source with the quadrupole ion guide 90 used with a triple-quad analyzer for MRM analysis. The MALDI target 36 and the focusing multipole ion guide 90 are contained in a first vacuum chamber 72 that is maintained at a gas pressure of about 2.5 Torr. The RF voltages applied by the power supply 92 to the poles of the quadrupole ion guide 90 are selected for the poles to operate in the damping gas pressure in the chamber 72 to provide the desired focusing effect. The rod set Q0 is disposed in a second vacuum chamber 60 at a pressure of about 5 mTorr, while the quadrupole ion guides Q1, Q2, and Q3 that form the triple-quad analyzer 30 are contained in a third vacuum chamber 96 that is maintained at a much lower pressure, such as about 0.01 mTorr. It should be appreciated that the laser-desorption ion source with ion guide coupling can be used with other types of ion mass analyzers, such as a time-of-flight or ion-trap mass analyzer.

When a laser pulse hits the MALDI target 36, a plume 70 of ions is generated and ejected into the space surrounded by the rods of the quadrupole ion guide 90. The inscribed diameter of the quadrupole ion guide 90 is selected to accept a significant portion, preferably 50% or more, of the ions in the plume. The quadrupole ion guide 90 alters the trajectories of the ions in the plume 70 received by it and guides the ions to go through the aperture 86 and enter the acceptance region of the quadrupole ion guide Q0 in the second vacuum chamber 60.

Figure 20:
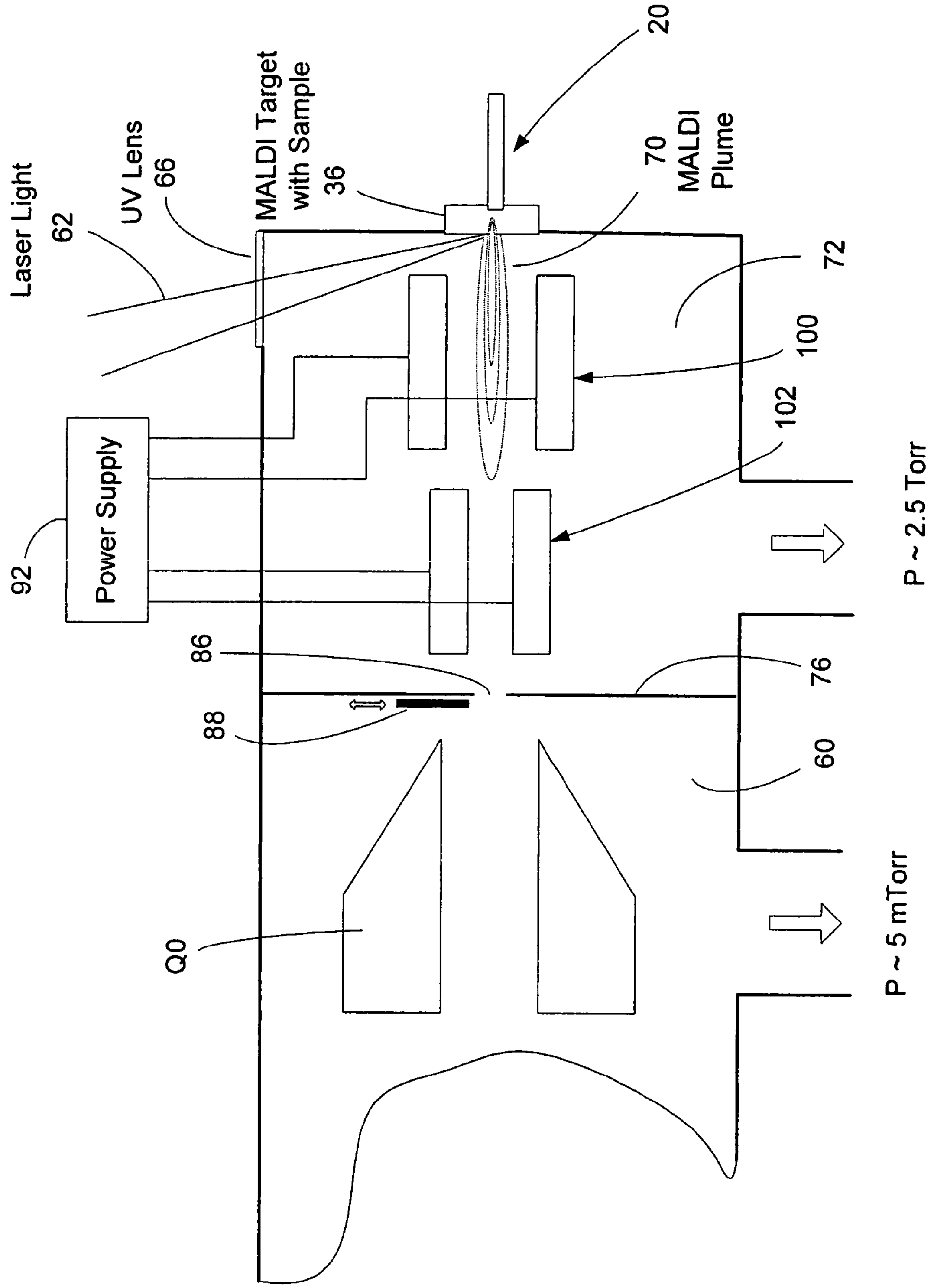
FIG. 20 is a schematic view of an embodiment of a MALDI source that uses two RF multipole ion guides of different dimensions to capture ions in a MALDI plume and guide the ions through an aperture into a next vacuum stage.

In accordance with another feature of the invention, an alternative ion coupling configuration uses two or more multipole ion guides, where each ion guide has a predetermined cross-section characterized by an inscribed circle with a diameter to capture ions in a plume from the MALDI target 36 and guide the ions to deliver them to a downstream vacuum chamber. As illustrated in FIG. 20 for an embodiment with two ion guides, a first multipole ion guide 100 and a second multipole ion guide 102 are disposed in the vacuum chamber 72 containing the MALDI target 36. In the embodiment shown in FIG. 20, similar to the previous embodiment, a third quadrupole ion guide Q0 is disposed in the second vacuum chamber 60, which is separated from the first vacuum chamber by the wall 76 that has an aperture 86 to allow ions to pass from the first vacuum chamber 72 into the second vacuum chamber 60. The two multipole ion guides 100 and 102 in the first chamber 72 are aligned such that their axes are on the line connecting the MALDI target 36 and the aperture 86 in the wall separating the first vacuum chamber 72 and the second vacuum chamber 60.

In operation, the first vacuum chamber 60 that contains the MALDI target 36 and the focusing ion guides 100 and 102 is maintained at a relatively high pressure selected to provide effective damping of the ions in the plume generated by a laser pulse hitting the MALDI target. The pressure of the damping gas may be, for example, 2.5 Torr, and preferably between 0.1 and 10 Torr. The second vacuum chamber 60, in contrast, is at a lower pressure, such as 5 mTorr. The power supply 92 provides the RF voltages for operating the ion guides 100 and 102. Alternatively, separate power supplies may be used for the ion guides 100 and 102, respectively.

A significant advantage of using two (or more) multipole ion guides for interfacing the MALDI source to the downstream components is that the multipole ion guides can be selected with different characteristics to optimize the total number of ions that can be guided to go through the aperture 86. To effectively capture the ions coming off the MALDI target 36, the first multipole ion guide 100 adjacent the MALDI target 36 is dimensioned to have a relatively large acceptance zone such that it is able to capture a substantial portion of the plume 70, preferably 50% or more. The second multipole ion guide 102, on the other hand, can be selected to have smaller dimensions to provide additional focusing. The larger dimensions of the first multipole ion guide 100 allow it to effectively capture the ions in a plume 70, even if the central axis of the plume is at an angle from the line pointing to the aperture 86. Since the first multipole ion guide 100 only has to focus the ions into the acceptance region of the second multipole ion guide 102, rather than into the much smaller aperture 86 directly, it can provide adequate focusing even with its relatively large dimensions.

In contrast, due to its smaller dimensions, the second multipole ion guide 102 can provide additional focusing to effectively guide the ions delivered to it by the first multipole ion guide 100 to go through the relatively small aperture 86 of the ion mass analyzer in the second chamber 60. In this way, the two multipole ion guides 100 and 102 can be tailored to provide both effective capturing of the ions in the plume 70 and effective focusing of the ions to pass through the aperture 86. In this regard, the power supply 92 is capable of providing different RF voltages to independently control the ion guides 100 and 102 to bring about different focusing effects.

In one embodiment, each of the first and second multipole ion guides 100 and 102 is a quadrupole ion guide, with the dimensions of their rods selected to provide the desired capturing and focusing characteristics. In various embodiments for optimum ion transmission of the plume 70 to the aperture 86, the relative ratio of the cross-sections of the second multipole ion guide to first multipole ion guide can be less than or equal to 1. By way of example, in one implementation, the first quadrupole rod set has an inscribed diameter of 7 mm and a rod length of 7 cm. The second quadrupole rod set has an inscribed diameter of 4 mm and a rod length of 5 cm. The diameter of the aperture 86 is about 1.7 mm. Consequently, the relative ratio in this case is about 0.6, although a smaller ratio may be used. In various embodiments, the cross-sections of the first and second multipole ion guides can be equal while the different RF voltages can be selected to provide RF confinement fields that are independently optimized for ion focusing/transmission.

Figure 21:
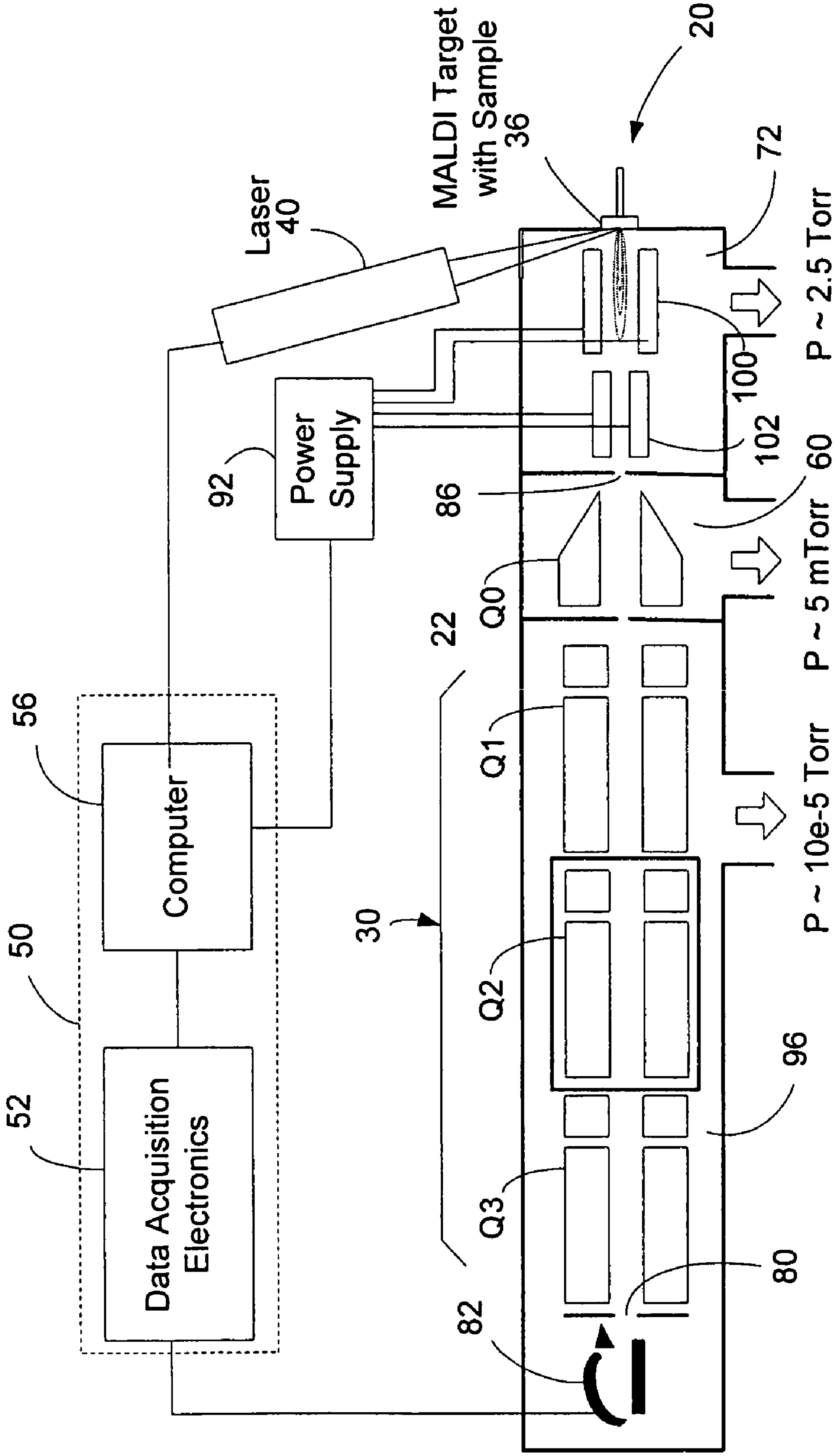
FIG. 21 is a schematic view of the MALDI source of FIG. 20 used together with a triple-quadrupole analyzer for MRM scans.

FIG. 21 shows the MALDI source with dual focusing multipole ion guides 100, 102 used with a triple quad analyzer disposed in a third vacuum chamber 96 for MRM analysis. It will be appreciated that this system is shown only as an example, and the approach of using two (or more) ion guides of different dimensions to provide effective coupling of ions from a laser desorption ion source to a downstream vacuum chamber can be effectively used with other types of ion analyzing techniques.

Besides the significantly improved sampling efficiency of the ions from the MALDI target and the resultant measurement sensitivity of the mass spectrometer, another important advantage of using the multipole ion guides is that the ion mass analyzer is largely isolated from contaminants coming from the MALDI target 36. Referring again to FIG. 20, when a laser pulse hits the MALDI target 36, a plume 70 is generated that contains ions as well as neutral particles. The neutral particles include the sample material, the matrix material, and a mixture thereof. If the ion mass analyzer is located directly downstream from and exposed to the MALDI target 36, the neutral particles may be deposited onto components of the ion mass analyzer, and can potentially cause degradation of the performance or even malfunction of the analyzing device.

In contrast, with the coupling arrangements shown in FIGS. 18 and 20, the ion mass analyzer is spatially separated from the MALDI target 36, and the small aperture 86 significantly limits the amount of contamination that might reach components of the analyzing device. As a result, the analyzing device can stay clean and provide a much longer service life before having to be cleaned or replaced.

In this regard, it is possible for the multipole ion guides 100, 102, especially the first ion guide 100 which is directly downstream from the MALDI target 36, to become contaminated by the particles released from the MALDI target. Nevertheless, having the analyzing device and the MALDI source contained in different vacuum chambers allows the focusing multipole ion guides to be taken out for cleaning without disturbing the ion analyzing device. To that end, a valve or shutter 88 is preferably provided for sealing the aperture 86 in the partition 76 separating the first and second vacuum chambers 72 and 60. When the multipole ion guides 100, 102 require cleaning, the valve or shutter 88 is used to close off the aperture 86 to prevent air leakage into the second vacuum chamber 60 through the aperture. The first vacuum chamber 72 can then be opened to remove one or both of the focusing multipole ion guides for cleaning. In this way, the cleaning operation for the ion guides can be carried out while that analyzing device is maintained under vacuum. The advantage of this aspect is significant, because an analyzing device typically requires precise alignments and can be easily damaged if care is not taken in a cleaning process. In addition, cleaning a mass analyzing element involves shutting down the vacuum system to the instrument, resulting in substantial delays due to, among other factors, instrument pump-down. The ability to maintain the mass analyzer under vacuum while operating on the ion guides effectively avoids such delays. To further simply the cleaning operation, the multipole ion guides 100 and 102 can have a modular construction to facilitate easy removal and reinstallation.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof. Although a triple-quadrupole mass spectrometer has been described as an example, it will be appreciated that other mass spectrometers known in the art, such as mass analyzing ion traps, can be effectively applied.

The invention claimed is:

1. An ion analyzing system comprising:

a first vacuum chamber;

a second vacuum chamber downstream from the first vacuum chamber, the first and second vacuum chambers being separated by a partition having an aperture formed therein to allow passage of ions from the first vacuum chamber into the second vacuum chamber;

a laser desorption ion target disposed in the first vacuum chamber; and first and second multipole ion guides disposed in the first vacuum chamber, the first multipole ion guide being adjacent the target and the second multipole ion guide being between the first multipole ion guide and the aperture, the first multipole ion guide having an inscribed diameter greater than an inscribed diameter of the second multipole ion guide and being disposed to accept a plume of ions generated from the laser desorption ion target and being operated to guide ions in the plume to enter the second multipole ion guide, the second multipole ion guide being operated to guide the ions to go through the aperture and enter the second vacuum chamber.

2. An ion analyzing system as in claim 1, wherein the first and second multipole ion guides are first and second quadrupole ion guides, respectively.

3. An ion analyzing system as in claim 1, wherein a ratio of the inscribed diameter of the second ion guide to the inscribed diameter of the first ion guide is less than or equal to 1.

4. An ion analyzing system as in claim 3, wherein the ratio is less than or equal to 0.6.

5. An ion analyzing system as in claim 4, wherein the first quadrupole ion guide has an inscribed diameter of about 7 mm.

6. An ion analyzing system as in claim 5, wherein the second quadrupole ion guide has an inscribed diameter of about 4 mm.

7. An ion analyzing system as in claim 1, wherein the first vacuum chamber is maintained at a gas pressure on the order of about one Torr to provide damping to the ions in the plume.

8. An ion analyzing system as in claim 7, wherein the gas pressure in the first vacuum chamber is between 0.1 and 10 Torr.

9. An ion analyzing system as in claim 1, further including a third multipole ion guide disposed in the second chamber and operated to provide collision cooling to ions transported into the second vacuum chamber through the aperture, and wherein the second vacuum chamber is maintained at a gas pressure on the order of 5 mTorr.

10. An ion analyzing system as in claim 9, further including a triple quadrupole analyzer disposed in a third vacuum chamber downstream of the third multipole ion guide.

11. An ion analyzing system as in claim 1, wherein the laser desorption ion target is a matrix-assisted laser desorption ion target.

* * * * *